US008020787B2

(12) United States Patent
Leber et al.

(10) Patent No.: US 8,020,787 B2
(45) Date of Patent: Sep. 20, 2011

(54) SHOWERHEAD SYSTEM

(75) Inventors: Leland C. Leber, Fort Collins, CO (US); Brian R. Williams, Fort Collins, CO (US)

(73) Assignee: Water Pik, Inc., Port Collins, CO (US)

( * ) Notice: Subject to any disclaimer, the term of this patent is extended or adjusted under 35 U.S.C. 154(b) by 330 days.

(21) Appl. No.: 11/947,733

(22) Filed: Nov. 29, 2007

(65) Prior Publication Data

US 2008/0121293 A1    May 29, 2008

Related U.S. Application Data

(60) Provisional application No. 60/867,778, filed on Nov. 29, 2006, provisional application No. 60/882,441, filed on Dec. 28, 2006.

(51) Int. Cl.
*B05B 1/18*    (2006.01)
*B05B 15/08*    (2006.01)
*F16K 11/07*    (2006.01)

(52) U.S. Cl. ............... 239/447; 239/443; 239/587.4; 137/625.42; 137/625.46

(58) Field of Classification Search .......... 239/396, 239/436, 442–444, 446–449, 525, 530, 532, 239/536, 548, 558–562, 567, 587.1–588; 137/625.42, 625.46
See application file for complete search history.

(56) References Cited

U.S. PATENT DOCUMENTS

| 203,094 | A | 4/1878 | Wakeman |
|---|---|---|---|
| 204,333 | A | 5/1878 | Josias |
| 309,349 | A | 12/1884 | Hart |
| 428,023 | A | 5/1890 | Schoff |
| 432,712 | A | 7/1890 | Taylor |
| 445,250 | A | 1/1891 | Lawless |
| 453,109 | A | 5/1891 | Dreisorner |
| 486,986 | A | 11/1892 | Schinkle |
| 566,384 | A | 8/1896 | Engelhart |
| 566,410 | A | 8/1896 | Schinke |
| 570,405 | A | 10/1896 | Jerguson et al. |
| 694,888 | A | 3/1902 | Pfluger |
| 800,802 | A | 10/1905 | Franquist |
| 832,523 | A | 10/1906 | Andersson |
| 835,678 | A | 11/1906 | Hammond |
| 845,540 | A | 2/1907 | Ferguson |
| 854,094 | A | 5/1907 | Klein |
| 926,929 | A | 7/1909 | Dusseau |
| 1,001,842 | A | 8/1911 | Greenfield |

(Continued)

FOREIGN PATENT DOCUMENTS

CA    659510    3/1963

(Continued)

OTHER PUBLICATIONS

Color Copy, Labeled 1A, Gemlo, available at least as early as Dec. 2, 1998.

(Continued)

*Primary Examiner* — Darren W Gorman
(74) *Attorney, Agent, or Firm* — Dorsey & Whitney LLP

(57) ABSTRACT

A showerhead system is provided. The showerhead system may provide a plurality of spray modes using a control mode selector located adjacent to a shower pipe. The showerhead system may also include an adjustment mechanism located near or about the shower pipe. The showerhead system may also have dual support structures.

22 Claims, 15 Drawing Sheets

U.S. PATENT DOCUMENTS

| | | |
|---|---|---|
| 1,003,037 A | 9/1911 | Crowe |
| 1,018,143 A | 2/1912 | Vissering |
| 1,046,573 A | 12/1912 | Ellis |
| 1,130,520 A | 3/1915 | Kenney |
| 1,203,466 A | 10/1916 | Benson |
| 1,217,254 A | 2/1917 | Winslow |
| 1,218,895 A | 3/1917 | Porter |
| 1,255,577 A | 2/1918 | Berry |
| 1,260,181 A | 3/1918 | Garnero |
| 1,276,117 A | 8/1918 | Riebe |
| 1,284,099 A | 11/1918 | Harris |
| 1,327,428 A | 1/1920 | Gregory |
| 1,451,800 A | 4/1923 | Agner |
| 1,459,582 A | 6/1923 | Dubee |
| 1,469,528 A | 10/1923 | Owens |
| 1,500,921 A | 7/1924 | Bramson et al. |
| 1,560,789 A | 11/1925 | Johnson et al. |
| 1,597,477 A | 8/1926 | Panhorst |
| 1,633,531 A | 6/1927 | Keller |
| 1,692,394 A | 11/1928 | Sundh |
| 1,695,263 A | 12/1928 | Jacques |
| 1,724,147 A | 8/1929 | Russell |
| 1,724,161 A | 8/1929 | Wuesthoff |
| 1,736,160 A | 11/1929 | Jonsson |
| 1,754,127 A | 4/1930 | Srulowitz |
| 1,758,115 A | 5/1930 | Kelly |
| 1,778,658 A | 10/1930 | Baker |
| 1,821,274 A | 9/1931 | Plummer |
| 1,849,517 A | 3/1932 | Fraser |
| 1,890,156 A | 12/1932 | Konig |
| 1,906,575 A | 5/1933 | Goeriz |
| 1,934,553 A | 11/1933 | Mueller et al. |
| 1,946,207 A | 2/1934 | Haire |
| 2,011,446 A | 8/1935 | Judell |
| 2,024,930 A | 12/1935 | Judell |
| 2,033,467 A | 3/1936 | Groeniger |
| 2,044,445 A | 6/1936 | Price et al. |
| 2,085,854 A | 7/1937 | Hathaway et al. |
| 2,096,912 A | 10/1937 | Morris |
| 2,117,152 A | 5/1938 | Crosti |
| D113,439 S | 2/1939 | Reinecke |
| 2,196,783 A | 4/1940 | Shook |
| 2,197,667 A | 4/1940 | Shook |
| 2,216,149 A | 10/1940 | Weiss |
| D126,433 S | 4/1941 | Enthof |
| 2,251,192 A | 7/1941 | Krumsiek et al. |
| 2,268,263 A | 12/1941 | Newell et al. |
| 2,285,831 A | 6/1942 | Pennypacker |
| 2,342,757 A | 2/1944 | Roser |
| 2,402,741 A | 6/1946 | Draviner |
| D147,258 S | 8/1947 | Becker |
| D152,584 S | 2/1949 | Becker |
| 2,467,954 A | 4/1949 | Becker |
| 2,546,348 A | 3/1951 | Schuman |
| 2,567,642 A | 9/1951 | Penshaw |
| 2,581,129 A | 1/1952 | Muldoon |
| D166,073 S | 3/1952 | Dunkelberger |
| 2,648,762 A | 8/1953 | Dunkelberger |
| 2,664,271 A | 12/1953 | Arutunoff |
| 2,671,693 A | 3/1954 | Hyser et al. |
| 2,676,806 A | 4/1954 | Bachman |
| 2,679,575 A | 5/1954 | Haberstump |
| 2,680,358 A | 6/1954 | Zublin |
| 2,726,120 A | 12/1955 | Bletcher et al. |
| 2,759,765 A | 8/1956 | Pawley |
| 2,776,168 A | 1/1957 | Schweda |
| 2,792,847 A | 5/1957 | Spencer |
| 2,873,999 A | 2/1959 | Webb |
| 2,930,505 A | 3/1960 | Meyer |
| 2,931,672 A | 4/1960 | Merritt et al. |
| 2,935,265 A | 5/1960 | Richter |
| 2,949,240 A * | 8/1960 | Koolnis ..................... 239/200 |
| 2,949,242 A | 8/1960 | Blumberg et al. |
| 2,957,587 A | 10/1960 | Tobin |
| 2,966,311 A | 12/1960 | Davis |
| D190,295 S | 5/1961 | Becker |
| 2,992,437 A | 7/1961 | Nelson et al. |
| 3,007,648 A | 11/1961 | Fraser |
| D192,935 S | 5/1962 | Becker |
| 3,032,357 A | 5/1962 | Shames et al. |
| 3,034,809 A | 5/1962 | Greenberg |
| 3,037,799 A | 6/1962 | Mulac |
| 3,081,339 A | 3/1963 | Green et al. |
| 3,092,333 A | 6/1963 | Gaiotto |
| 3,098,508 A | 7/1963 | Gerdes |
| 3,103,723 A | 9/1963 | Becker |
| 3,104,815 A | 9/1963 | Schultz |
| 3,104,827 A | 9/1963 | Aghnides |
| 3,111,277 A | 11/1963 | Grimsley |
| 3,112,073 A | 11/1963 | Larson et al. |
| 3,143,857 A | 8/1964 | Eaton |
| 3,196,463 A | 7/1965 | Farneth |
| 3,231,200 A | 1/1966 | Heald |
| 3,236,545 A | 2/1966 | Parkes et al. |
| 3,239,152 A | 3/1966 | Bachli et al. |
| 3,266,059 A | 8/1966 | Stelle |
| 3,272,437 A | 9/1966 | Coson |
| 3,273,359 A | 9/1966 | Fregeolle |
| 3,306,634 A | 2/1967 | Groves et al. |
| 3,323,148 A | 6/1967 | Burnon |
| 3,329,967 A | 7/1967 | Martinez et al. |
| 3,341,132 A | 9/1967 | Parkison |
| 3,342,419 A | 9/1967 | Weese |
| 3,344,994 A | 10/1967 | Fife |
| 3,363,842 A | 1/1968 | Burns |
| 3,383,051 A | 5/1968 | Fiorentino |
| 3,389,925 A | 6/1968 | Gottschald |
| 3,393,311 A | 7/1968 | Dahl |
| 3,393,312 A | 7/1968 | Dahl |
| 3,404,410 A | 10/1968 | Sumida |
| 3,492,029 A | 1/1970 | French et al. |
| 3,516,611 A | 6/1970 | Piggott |
| 3,546,961 A | 12/1970 | Marton |
| 3,550,863 A | 12/1970 | McDermott |
| 3,552,436 A | 1/1971 | Stewart |
| 3,565,116 A | 2/1971 | Gabin |
| 3,566,917 A | 3/1971 | White |
| 3,580,513 A | 5/1971 | Martin |
| 3,584,822 A | 6/1971 | Oram |
| 3,596,835 A | 8/1971 | Smith et al. |
| 3,612,577 A | 10/1971 | Pope |
| 3,637,143 A | 1/1972 | Shames et al. |
| 3,641,333 A | 2/1972 | Gendron |
| 3,647,144 A | 3/1972 | Parkison et al. |
| 3,663,044 A | 5/1972 | Contreras et al. |
| 3,669,470 A | 6/1972 | Deurloo |
| 3,672,648 A | 6/1972 | Price |
| 3,682,392 A | 8/1972 | Kint |
| 3,685,745 A | 8/1972 | Peschcke-Koedt |
| D224,834 S | 9/1972 | Laudell |
| 3,711,029 A | 1/1973 | Bartlett |
| 3,722,798 A | 3/1973 | Bletcher et al. |
| 3,722,799 A | 3/1973 | Rauh |
| 3,731,084 A | 5/1973 | Trevorrow |
| 3,754,779 A | 8/1973 | Peress |
| D228,622 S | 10/1973 | Jublin |
| 3,762,648 A | 10/1973 | Deines et al. |
| 3,768,735 A | 10/1973 | Ward |
| 3,786,995 A | 1/1974 | Manoogian et al. |
| 3,801,019 A | 4/1974 | Trenary et al. |
| 3,810,580 A | 5/1974 | Rauh |
| 3,826,454 A | 7/1974 | Zieger |
| 3,840,734 A | 10/1974 | Oram |
| 3,845,291 A | 10/1974 | Portyrata |
| 3,860,271 A | 1/1975 | Rodgers |
| 3,861,719 A | 1/1975 | Hand |
| 3,865,310 A | 2/1975 | Elkins et al. |
| 3,869,151 A | 3/1975 | Fletcher et al. |
| 3,896,845 A | 7/1975 | Parker |
| 3,902,671 A | 9/1975 | Symmons |
| 3,910,277 A | 10/1975 | Zimmer |
| D237,708 S | 11/1975 | Grohe |
| 3,929,164 A | 12/1975 | Richter |
| 3,958,756 A | 5/1976 | Trenary et al. |
| D240,322 S | 6/1976 | Staub |
| 3,967,783 A | 7/1976 | Halsted et al. |
| 3,979,096 A | 9/1976 | Zieger |

| | | | | | |
|---|---|---|---|---|---|
| 3,997,116 A | 12/1976 | Moen | 4,588,130 A | 5/1986 | Trenary et al. |
| 3,998,390 A | 12/1976 | Peterson et al. | 4,598,866 A | 7/1986 | Cammack et al. |
| 3,999,714 A | 12/1976 | Lang | 4,614,303 A | 9/1986 | Moseley, Jr. et al. |
| 4,005,880 A | 2/1977 | Anderson et al. | 4,616,298 A | 10/1986 | Bolson |
| 4,006,920 A | 2/1977 | Sadler et al. | 4,618,100 A | 10/1986 | White et al. |
| 4,023,782 A | 5/1977 | Eifer | 4,629,124 A | 12/1986 | Gruber |
| 4,042,984 A | 8/1977 | Butler | 4,629,125 A | 12/1986 | Liu |
| 4,045,054 A | 8/1977 | Arnold | 4,643,463 A | 2/1987 | Halling et al. |
| D245,858 S | 9/1977 | Grube | 4,645,244 A | 2/1987 | Curtis |
| D245,860 S | 9/1977 | Grube | RE32,386 E | 3/1987 | Hunter |
| 4,068,801 A | 1/1978 | Leutheuser | 4,650,120 A | 3/1987 | Kress |
| 4,081,135 A | 3/1978 | Tomaro | 4,650,470 A | 3/1987 | Epstein |
| 4,084,271 A | 4/1978 | Ginsberg | 4,652,025 A | 3/1987 | Conroy, Sr. |
| 4,091,998 A | 5/1978 | Peterson | 4,654,900 A | 4/1987 | McGhee |
| D249,356 S | 9/1978 | Nagy | 4,657,185 A | 4/1987 | Rundzaitis |
| 4,117,979 A | 10/1978 | Lagarelli et al. | 4,669,666 A | 6/1987 | Finkbeiner |
| 4,129,257 A | 12/1978 | Eggert | 4,669,757 A | 6/1987 | Bartholomew |
| 4,130,120 A | 12/1978 | Kohler, Jr. | 4,674,687 A | 6/1987 | Smith et al. |
| 4,131,233 A | 12/1978 | Koenig | 4,683,917 A | 8/1987 | Bartholomew |
| 4,133,486 A | 1/1979 | Fanella | 4,703,893 A | 11/1987 | Gruber |
| 4,135,549 A | 1/1979 | Baker | 4,717,180 A | 1/1988 | Roman |
| D251,045 S | 2/1979 | Grube | 4,719,654 A | 1/1988 | Blessing |
| 4,141,502 A | 2/1979 | Grohe | 4,733,337 A | 3/1988 | Bieberstein |
| 4,151,955 A | 5/1979 | Stouffer | D295,437 S | 4/1988 | Fabian |
| 4,151,957 A | 5/1979 | Gecewicz et al. | 4,739,801 A | 4/1988 | Kimura et al. |
| 4,162,801 A | 7/1979 | Kresky et al. | 4,749,126 A | 6/1988 | Kessener et al. |
| 4,165,837 A | 8/1979 | Rundzaitis | D296,582 S | 7/1988 | Haug et al. |
| 4,167,196 A | 9/1979 | Morris | 4,754,928 A | 7/1988 | Rogers et al. |
| 4,174,822 A | 11/1979 | Larsson | D297,160 S | 8/1988 | Robbins |
| 4,185,781 A | 1/1980 | O'Brien | 4,764,047 A | 8/1988 | Johnston et al. |
| 4,190,207 A | 2/1980 | Fienhold et al. | 4,778,104 A | 10/1988 | Fisher |
| 4,191,332 A | 3/1980 | De Langis et al. | 4,787,591 A | 11/1988 | Villacorta |
| 4,203,550 A | 5/1980 | On | 4,790,294 A | 12/1988 | Allred, III et al. |
| 4,209,132 A | 6/1980 | Kwan | 4,801,091 A | 1/1989 | Sandvik |
| D255,626 S | 7/1980 | Grube | 4,809,369 A | 3/1989 | Bowden |
| 4,219,160 A | 8/1980 | Allred, Jr. | 4,839,599 A | 6/1989 | Fischer |
| 4,221,338 A | 9/1980 | Shames et al. | 4,842,059 A | 6/1989 | Tomek |
| 4,243,253 A | 1/1981 | Rogers, Jr. | D302,325 S | 7/1989 | Charet et al. |
| 4,244,526 A | 1/1981 | Arth | 4,850,616 A | 7/1989 | Pava |
| D258,677 S | 3/1981 | Larsson | 4,854,499 A | 8/1989 | Neuman |
| 4,254,914 A | 3/1981 | Shames et al. | 4,856,822 A | 8/1989 | Parker |
| 4,258,414 A | 3/1981 | Sokol | 4,865,362 A | 9/1989 | Holden |
| 4,272,022 A | 6/1981 | Evans | D303,830 S | 10/1989 | Ramsey et al. |
| 4,274,400 A | 6/1981 | Baus | 4,871,196 A | 10/1989 | Kingsford |
| 4,282,612 A | 8/1981 | King | 4,896,658 A | 1/1990 | Yonekubo et al. |
| D261,300 S | 10/1981 | Klose | D306,351 S | 2/1990 | Charet et al. |
| D261,417 S | 10/1981 | Klose | 4,901,927 A | 2/1990 | Valdivia |
| 4,303,201 A | 12/1981 | Elkins et al. | 4,903,178 A | 2/1990 | Englot et al. |
| 4,319,608 A | 3/1982 | Raikov et al. | 4,903,897 A | 2/1990 | Hayes |
| 4,330,089 A | 5/1982 | Finkbeiner | 4,903,922 A | 2/1990 | Harris, III |
| D266,212 S | 9/1982 | Haug et al. | 4,907,137 A | 3/1990 | Schladitz et al. |
| 4,350,298 A | 9/1982 | Tada | 4,907,744 A | 3/1990 | Jousson |
| 4,353,508 A | 10/1982 | Butterfield et al. | 4,909,435 A | 3/1990 | Kidouchi et al. |
| 4,358,056 A | 11/1982 | Greenhut et al. | 4,914,759 A | 4/1990 | Goff |
| D267,582 S | 1/1983 | Mackay et al. | 4,946,202 A | 8/1990 | Perricone |
| D268,359 S | 3/1983 | Klose | 4,951,329 A | 8/1990 | Shaw |
| D268,442 S | 3/1983 | Darmon | 4,953,585 A | 9/1990 | Rollini et al. |
| D268,611 S | 4/1983 | Klose | 4,964,573 A | 10/1990 | Lipski |
| 4,383,554 A | 5/1983 | Merriman | 4,972,048 A | 11/1990 | Martin |
| 4,396,797 A | 8/1983 | Sakuragi et al. | D313,267 S | 12/1990 | Lenci et al. |
| 4,398,669 A | 8/1983 | Fienhold | 4,976,460 A | 12/1990 | Newcombe et al. |
| 4,425,965 A | 1/1984 | Bayh, III et al. | D314,246 S | 1/1991 | Bache |
| 4,432,392 A | 2/1984 | Paley | D315,191 S | 3/1991 | Mikol |
| D274,457 S | 6/1984 | Haug | 4,998,673 A | 3/1991 | Pilolla |
| 4,461,052 A | 7/1984 | Mostul | 5,004,158 A | 4/1991 | Halem et al. |
| 4,465,308 A | 8/1984 | Martini | D317,348 S | 6/1991 | Geneve et al. |
| 4,467,964 A | 8/1984 | Kaeser | 5,020,570 A | 6/1991 | Cotter |
| 4,495,550 A | 1/1985 | Visciano | 5,022,103 A | 6/1991 | Faist |
| 4,527,745 A | 7/1985 | Butterfield et al. | 5,032,015 A | 7/1991 | Christianson |
| 4,540,202 A | 9/1985 | Amphoux et al. | 5,033,528 A | 7/1991 | Volcani |
| 4,545,081 A | 10/1985 | Nestor et al. | 5,033,897 A | 7/1991 | Chen |
| 4,553,775 A | 11/1985 | Halling | D319,294 S | 8/1991 | Kohler, Jr. et al. |
| D281,820 S | 12/1985 | Oba et al. | D320,064 S | 9/1991 | Presman |
| 4,561,593 A | 12/1985 | Cammack et al. | 5,046,764 A | 9/1991 | Kimura et al. |
| 4,564,889 A | 1/1986 | Bolson | D321,062 S | 10/1991 | Bonbright |
| 4,571,003 A | 2/1986 | Roling et al. | 5,058,804 A | 10/1991 | Yonekubo et al. |
| 4,572,232 A | 2/1986 | Gruber | D322,119 S | 12/1991 | Haug et al. |
| D283,645 S | 4/1986 | Tanaka | D322,681 S | 12/1991 | Yuen |
| 4,587,991 A | 5/1986 | Chorkey | 5,070,552 A | 12/1991 | Gentry et al. |

| | | |
|---|---|---|
| D323,545 S | 1/1992 | Ward |
| 5,082,019 A | 1/1992 | Tetrault |
| 5,086,878 A | 2/1992 | Swift |
| 5,090,624 A | 2/1992 | Rogers |
| 5,100,055 A | 3/1992 | Rokitenetz et al. |
| D325,769 S | 4/1992 | Haug et al. |
| D325,770 S | 4/1992 | Haug et al. |
| 5,103,384 A | 4/1992 | Drohan |
| D326,311 S | 5/1992 | Lenci et al. |
| D327,115 S | 6/1992 | Rogers |
| 5,121,511 A | 6/1992 | Sakamoto et al. |
| D327,729 S | 7/1992 | Rogers |
| 5,127,580 A | 7/1992 | Fu-I |
| 5,134,251 A | 7/1992 | Martin |
| D328,944 S | 8/1992 | Robbins |
| 5,141,016 A | 8/1992 | Nowicki |
| D329,504 S | 9/1992 | Yuen |
| 5,143,300 A | 9/1992 | Cutler |
| 5,145,114 A | 9/1992 | Monch |
| 5,148,556 A | 9/1992 | Bottoms et al. |
| D330,068 S | 10/1992 | Haug et al. |
| D330,408 S | 10/1992 | Thacker |
| D330,409 S | 10/1992 | Raffo |
| 5,153,976 A | 10/1992 | Benchaar et al. |
| 5,154,355 A | 10/1992 | Gonzalez |
| 5,154,483 A | 10/1992 | Zeller |
| 5,161,567 A | 11/1992 | Humpert |
| 5,163,752 A | 11/1992 | Copeland et al. |
| 5,171,429 A | 12/1992 | Yasuo |
| 5,172,860 A | 12/1992 | Yuch |
| 5,172,862 A | 12/1992 | Heimann et al. |
| 5,172,866 A | 12/1992 | Ward |
| D332,303 S | 1/1993 | Klose |
| D332,994 S | 2/1993 | Huen |
| D333,339 S | 2/1993 | Klose |
| 5,197,767 A | 3/1993 | Kimura et al. |
| D334,794 S | 4/1993 | Klose |
| D335,171 S | 4/1993 | Lenci et al. |
| 5,201,468 A | 4/1993 | Freier et al. |
| 5,206,963 A | 5/1993 | Wiens |
| 5,207,499 A | 5/1993 | Vajda et al. |
| 5,213,267 A | 5/1993 | Heimann et al. |
| 5,220,697 A | 6/1993 | Birchfield |
| D337,839 S | 7/1993 | Zeller |
| 5,228,625 A | 7/1993 | Grassberger |
| 5,230,106 A | 7/1993 | Henkin et al. |
| D338,542 S | 8/1993 | Yuen |
| 5,232,162 A | 8/1993 | Chih |
| D339,492 S | 9/1993 | Klose |
| D339,627 S | 9/1993 | Klose |
| D339,848 S | 9/1993 | Gottwald |
| 5,246,169 A | 9/1993 | Heimann et al. |
| 5,246,301 A | 9/1993 | Hirasawa |
| D340,376 S | 10/1993 | Klose |
| 5,253,670 A | 10/1993 | Perrott |
| 5,253,807 A | 10/1993 | Newbegin |
| 5,254,809 A | 10/1993 | Martin |
| D341,007 S | 11/1993 | Haug et al. |
| D341,191 S | 11/1993 | Klose |
| D341,220 S | 11/1993 | Eagan |
| 5,263,646 A | 11/1993 | McCauley |
| 5,265,833 A | 11/1993 | Heimann et al. |
| 5,268,826 A | 12/1993 | Greene |
| 5,276,596 A | 1/1994 | Krenzel |
| 5,277,391 A | 1/1994 | Haug et al. |
| 5,286,071 A | 2/1994 | Storage |
| 5,288,110 A | 2/1994 | Allread |
| 5,294,054 A | 3/1994 | Benedict et al. |
| 5,297,735 A | 3/1994 | Heimann et al. |
| 5,297,739 A | 3/1994 | Allen |
| D345,811 S | 4/1994 | Van Deursen et al. |
| D346,426 S | 4/1994 | Warshawsky |
| D346,428 S | 4/1994 | Warshawsky |
| D346,430 S | 4/1994 | Warshawsky |
| D347,262 S | 5/1994 | Black et al. |
| D347,265 S | 5/1994 | Gottwald |
| 5,316,216 A | 5/1994 | Cammack et al. |
| D348,720 S | 7/1994 | Haug et al. |
| 5,329,650 A | 7/1994 | Zaccai et al. |
| D349,947 S | 8/1994 | Hing-Wah |
| 5,333,787 A | 8/1994 | Smith et al. |
| 5,333,789 A | 8/1994 | Garneys |
| 5,340,064 A | 8/1994 | Heimann et al. |
| 5,340,165 A | 8/1994 | Sheppard |
| D350,808 S | 9/1994 | Warshawsky |
| 5,344,080 A | 9/1994 | Matsui |
| 5,349,987 A | 9/1994 | Shieh |
| 5,356,076 A | 10/1994 | Bishop |
| 5,356,077 A | 10/1994 | Shames |
| D352,092 S | 11/1994 | Warshawsky |
| D352,347 S | 11/1994 | Dannenberg |
| D352,766 S | 11/1994 | Hill et al. |
| 5,368,235 A | 11/1994 | Drozdoff et al. |
| 5,369,556 A | 11/1994 | Zeller |
| 5,370,427 A | 12/1994 | Hoelle et al. |
| 5,385,500 A | 1/1995 | Schmidt |
| D355,242 S | 2/1995 | Warshawsky |
| D355,703 S | 2/1995 | Duell |
| D356,626 S | 3/1995 | Wang |
| 5,397,064 A | 3/1995 | Heitzman |
| 5,398,872 A | 3/1995 | Joubran |
| 5,398,977 A | 3/1995 | Berger et al. |
| 5,402,812 A | 4/1995 | Moineau et al. |
| 5,405,089 A | 4/1995 | Heimann et al. |
| 5,414,879 A | 5/1995 | Hiraishi et al. |
| 5,423,348 A | 6/1995 | Jezek et al. |
| 5,433,384 A | 7/1995 | Chan et al. |
| D361,399 S | 8/1995 | Carbone et al. |
| D361,623 S | 8/1995 | Huen |
| 5,441,075 A | 8/1995 | Clare |
| 5,449,206 A | 9/1995 | Lockwood |
| D363,360 S | 10/1995 | Santarsiero |
| 5,454,809 A | 10/1995 | Janssen |
| 5,468,057 A | 11/1995 | Megerle et al. |
| D364,935 S | 12/1995 | deBlois |
| D365,625 S | 12/1995 | Bova |
| D365,646 S | 12/1995 | deBlois |
| 5,476,225 A | 12/1995 | Chan |
| D366,309 S | 1/1996 | Huang |
| D366,707 S | 1/1996 | Kaiser |
| D366,708 S | 1/1996 | Santarsiero |
| D366,709 S | 1/1996 | Szmanski |
| D366,710 S | 1/1996 | Szymanski |
| 5,481,765 A | 1/1996 | Wang |
| D366,948 S | 2/1996 | Carbone |
| D367,315 S | 2/1996 | Andrus |
| D367,333 S | 2/1996 | Swyst |
| D367,696 S | 3/1996 | Andrus |
| D367,934 S | 3/1996 | Carbone |
| D368,146 S | 3/1996 | Carbone |
| D368,317 S | 3/1996 | Swyst |
| 5,499,767 A | 3/1996 | Morand |
| D368,539 S | 4/1996 | Carbone et al. |
| D368,540 S | 4/1996 | Santarsiero |
| D368,541 S | 4/1996 | Kaiser et al. |
| D368,542 S | 4/1996 | deBlois et al. |
| D369,204 S | 4/1996 | Andrus |
| D369,205 S | 4/1996 | Andrus |
| 5,507,436 A | 4/1996 | Ruttenberg |
| D369,873 S | 5/1996 | deBlois et al. |
| D369,874 S | 5/1996 | Santarsiero |
| D369,875 S | 5/1996 | Carbone |
| D370,052 S | 5/1996 | Chan et al. |
| D370,250 S | 5/1996 | Fawcett et al. |
| D370,277 S | 5/1996 | Kaiser |
| D370,278 S | 5/1996 | Nolan |
| D370,279 S | 5/1996 | deBlois |
| D370,280 S | 5/1996 | Kaiser |
| D370,281 S | 5/1996 | Johnstone et al. |
| 5,517,392 A | 5/1996 | Rousso et al. |
| 5,521,803 A | 5/1996 | Eckert et al. |
| D370,542 S | 6/1996 | Santarsiero |
| D370,735 S | 6/1996 | deBlois |
| D370,987 S | 6/1996 | Santarsiero |
| D370,988 S | 6/1996 | Santarsiero |
| D371,448 S | 7/1996 | Santarsiero |
| D371,618 S | 7/1996 | Nolan |
| D371,619 S | 7/1996 | Szymanski |

| | | | | | |
|---|---|---|---|---|---|
| D371,856 S | 7/1996 | Carbone | 5,772,120 A | 6/1998 | Huber |
| D372,318 S | 7/1996 | Szymanski | 5,778,939 A | 7/1998 | Hok-Yin |
| D372,319 S | 7/1996 | Carbone | 5,788,157 A | 8/1998 | Kress |
| 5,531,625 A | 7/1996 | Zhong | D398,370 S | 9/1998 | Purdy |
| 5,539,624 A | 7/1996 | Dougherty | 5,806,771 A | 9/1998 | Loschelder et al. |
| D372,548 S | 8/1996 | Carbone | 5,819,791 A | 10/1998 | Chronister et al. |
| D372,998 S | 8/1996 | Carbone | 5,820,574 A | 10/1998 | Henkin et al. |
| D373,210 S | 8/1996 | Santarsiero | 5,823,431 A | 10/1998 | Pierce |
| D373,434 S | 9/1996 | Nolan | 5,823,442 A | 10/1998 | Guo |
| D373,435 S | 9/1996 | Nolan | 5,826,803 A | 10/1998 | Cooper |
| D373,645 S | 9/1996 | Johnstone et al. | 5,833,138 A | 11/1998 | Crane et al. |
| D373,646 S | 9/1996 | Szymanski et al. | 5,839,666 A | 11/1998 | Heimann et al. |
| D373,647 S | 9/1996 | Kaiser | D402,350 S | 12/1998 | Andrus et al. |
| D373,648 S | 9/1996 | Kaiser | D403,754 S | 1/1999 | Gottwald |
| D373,649 S | 9/1996 | Carbone | D404,116 S | 1/1999 | Bosio |
| D373,651 S | 9/1996 | Szymanski | 5,855,348 A | 1/1999 | Fornara |
| D373,652 S | 9/1996 | Kaiser | 5,860,599 A | 1/1999 | Lin |
| 5,551,637 A | 9/1996 | Lo | 5,862,543 A | 1/1999 | Reynoso et al. |
| 5,552,973 A | 9/1996 | Hsu | 5,862,985 A | 1/1999 | Neibrook et al. |
| 5,558,278 A | 9/1996 | Gallorini | D405,502 S | 2/1999 | Tse |
| D374,271 S | 10/1996 | Fleischmann | 5,865,375 A | 2/1999 | Hsu |
| D374,297 S | 10/1996 | Kaiser | 5,865,378 A | 2/1999 | Hollinshead et al. |
| D374,298 S | 10/1996 | Swyst | 5,873,647 A | 2/1999 | Kurtz et al. |
| D374,299 S | 10/1996 | Carbone | D408,893 S | 4/1999 | Tse |
| D374,493 S | 10/1996 | Szymanski | D409,276 S | 5/1999 | Ratzlaff |
| D374,494 S | 10/1996 | Santarsiero | D410,276 S | 5/1999 | Ben-Tsur |
| D374,732 S | 10/1996 | Kaiser | 5,918,809 A | 7/1999 | Simmons |
| D374,733 S | 10/1996 | Santasiero | 5,918,811 A | 7/1999 | Denham et al. |
| 5,560,548 A | 10/1996 | Mueller et al. | D413,157 S | 8/1999 | Ratzlaff |
| 5,567,115 A | 10/1996 | Carbone | 5,937,905 A | 8/1999 | Santos |
| D375,541 S | 11/1996 | Michaluk | 5,938,123 A | 8/1999 | Heitzman |
| 5,577,664 A | 11/1996 | Heitzman | 5,941,462 A | 8/1999 | Sandor |
| D376,217 S | 12/1996 | Kaiser | 5,947,388 A | 9/1999 | Woodruff |
| D376,860 S | 12/1996 | Santarsiero | D415,247 S | 10/1999 | Haverstraw et al. |
| D376,861 S | 12/1996 | Johnstone et al. | 5,961,046 A | 10/1999 | Joubran |
| D376,862 S | 12/1996 | Carbone | 5,979,776 A | 11/1999 | Williams |
| 5,605,173 A | 2/1997 | Arnaud | 5,992,762 A | 11/1999 | Wang |
| D378,401 S | 3/1997 | Neufeld et al. | D418,200 S | 12/1999 | Ben-Tsur |
| 5,613,638 A | 3/1997 | Blessing | 5,997,047 A | 12/1999 | Pimentel et al. |
| 5,613,639 A | 3/1997 | Storm et al. | 6,003,165 A | 12/1999 | Loyd |
| 5,615,837 A | 4/1997 | Roman | D418,902 S | 1/2000 | Haverstraw et al. |
| 5,624,074 A | 4/1997 | Parisi | D418,903 S | 1/2000 | Haverstraw et al. |
| 5,624,498 A | 4/1997 | Lee et al. | D418,904 S | 1/2000 | Milrud |
| D379,212 S | 5/1997 | Chan | D421,099 S | 2/2000 | Mullenmeister |
| D379,404 S | 5/1997 | Spelts | 6,021,960 A | 2/2000 | Kehat |
| 5,632,049 A | 5/1997 | Chen | D422,053 S | 3/2000 | Brenner et al. |
| D381,405 S | 7/1997 | Waidele et al. | 6,042,027 A | 3/2000 | Sandvik |
| D381,737 S | 7/1997 | Chan | 6,042,155 A | 3/2000 | Lockwood |
| D382,936 S | 8/1997 | Shfaram | D422,336 S | 4/2000 | Haverstraw et al. |
| 5,653,260 A | 8/1997 | Huber | D422,337 S | 4/2000 | Chan |
| 5,667,146 A | 9/1997 | Pimentel et al. | D423,083 S | 4/2000 | Haug et al. |
| D385,332 S | 10/1997 | Andrus | D423,110 S | 4/2000 | Cipkowski |
| D385,333 S | 10/1997 | Caroen et al. | D424,160 S | 5/2000 | Haug et al. |
| D385,334 S | 10/1997 | Caroen et al. | D424,161 S | 5/2000 | Haug et al. |
| D385,616 S | 10/1997 | Dow et al. | D424,162 S | 5/2000 | Haug et al. |
| D385,947 S | 11/1997 | Dow et al. | D424,163 S | 5/2000 | Haug et al. |
| D387,230 S | 12/1997 | von Buelow et al. | D426,290 S | 6/2000 | Haug et al. |
| 5,699,964 A | 12/1997 | Bergmann et al. | D427,661 S | 7/2000 | Haverstraw et al. |
| 5,702,057 A | 12/1997 | Huber | D428,110 S | 7/2000 | Haug et al. |
| D389,558 S | 1/1998 | Andrus | D428,125 S | 7/2000 | Chan |
| 5,704,080 A | 1/1998 | Kuhne | 6,085,780 A | 7/2000 | Morris |
| 5,707,011 A | 1/1998 | Bosio | D430,267 S | 8/2000 | Milrud et al. |
| 5,718,380 A | 2/1998 | Schorn et al. | 6,095,801 A | 8/2000 | Spiewak |
| D392,369 S | 3/1998 | Chan | D430,643 S | 9/2000 | Tse |
| 5,730,361 A | 3/1998 | Thonnes | 6,113,002 A | 9/2000 | Finkbeiner |
| 5,730,362 A | 3/1998 | Cordes | 6,123,272 A | 9/2000 | Havican et al. |
| 5,730,363 A | 3/1998 | Kress | 6,123,308 A | 9/2000 | Faisst |
| 5,742,961 A | 4/1998 | Casperson et al. | D432,624 S | 10/2000 | Chan |
| D394,490 S | 5/1998 | Andrus et al. | D432,625 S | 10/2000 | Chan |
| 5,746,375 A | 5/1998 | Guo | D433,096 S | 10/2000 | Tse |
| 5,749,552 A | 5/1998 | Fan | D433,097 S | 10/2000 | Tse |
| 5,749,602 A | 5/1998 | Delaney et al. | 6,126,091 A | 10/2000 | Heitzman |
| D394,899 S | 6/1998 | Caroen et al. | 6,126,290 A | 10/2000 | Veigel |
| D395,074 S | 6/1998 | Neibrook et al. | D434,109 S | 11/2000 | Ko |
| D395,075 S | 6/1998 | Kolada | 6,164,569 A | 12/2000 | Hollinshead et al. |
| D395,142 S | 6/1998 | Neibrook | 6,164,570 A | 12/2000 | Smeltzer |
| 5,764,760 A | 6/1998 | Grandbert et al. | D435,889 S | 1/2001 | Ben-Tsur et al. |
| 5,765,760 A | 6/1998 | Kuo | D439,305 S | 3/2001 | Slothower |
| 5,769,802 A | 6/1998 | Wang | 6,199,580 B1 | 3/2001 | Morris |

| | | | |
|---|---|---|---|
| 6,202,679 B1 | 3/2001 | Titus | |
| D440,276 S | 4/2001 | Slothower | |
| D440,277 S | 4/2001 | Slothower | |
| D440,278 S | 4/2001 | Slothower | |
| D441,059 S | 4/2001 | Fleischmann | |
| 6,209,799 B1 | 4/2001 | Finkbeiner | |
| D443,025 S | 5/2001 | Kollmann et al. | |
| D443,026 S | 5/2001 | Kollmann et al. | |
| D443,027 S | 5/2001 | Kollmann et al. | |
| D443,029 S | 5/2001 | Kollmann et al. | |
| 6,223,998 B1 | 5/2001 | Heitzman | |
| 6,230,984 B1 | 5/2001 | Jager | |
| 6,230,988 B1 | 5/2001 | Chao et al. | |
| 6,230,989 B1 | 5/2001 | Haverstraw et al. | |
| D443,335 S | 6/2001 | Andrus | |
| D443,336 S | 6/2001 | Kollmann et al. | |
| D443,347 S | 6/2001 | Gottwald | |
| 6,241,166 B1 | 6/2001 | Overington et al. | |
| 6,250,572 B1 | 6/2001 | Chen | |
| D444,865 S | 7/2001 | Gottwald | |
| D445,871 S | 7/2001 | Fan | |
| 6,254,014 B1 | 7/2001 | Clearman et al. | |
| 6,270,278 B1 | 8/2001 | Mauro | |
| 6,276,004 B1 | 8/2001 | Bertrand et al. | |
| 6,283,447 B1 | 9/2001 | Fleet | |
| 6,286,764 B1 | 9/2001 | Garvey et al. | |
| D449,673 S | 10/2001 | Kollmann et al. | |
| D450,370 S | 11/2001 | Wales et al. | |
| D450,805 S | 11/2001 | Lindholm et al. | |
| D450,806 S | 11/2001 | Lindholm et al. | |
| D450,807 S | 11/2001 | Lindholm et al. | |
| D451,169 S | 11/2001 | Lindholm et al. | |
| D451,170 S | 11/2001 | Lindholm et al. | |
| D451,171 S | 11/2001 | Lindholm et al. | |
| D451,172 S | 11/2001 | Lindholm et al. | |
| 6,321,777 B1 | 11/2001 | Wu | |
| 6,322,006 B1 | 11/2001 | Guo | |
| D451,583 S | 12/2001 | Lindholm et al. | |
| D451,980 S | 12/2001 | Lindholm et al. | |
| D452,553 S | 12/2001 | Lindholm et al. | |
| D452,725 S | 1/2002 | Lindholm et al. | |
| D452,897 S | 1/2002 | Gillette et al. | |
| 6,336,764 B1 | 1/2002 | Liu | |
| D453,369 S | 2/2002 | Lobermeier | |
| D453,370 S | 2/2002 | Lindholm et al. | |
| D453,550 S * | 2/2002 | Lobermeier | D23/228 |
| D453,551 S | 2/2002 | Lindholm et al. | |
| 6,349,735 B2 | 2/2002 | Gul | |
| D454,617 S | 3/2002 | Curbbun et al. | |
| D454,938 S | 3/2002 | Lord | |
| 6,375,342 B1 | 4/2002 | Koren et al. | |
| D457,937 S | 5/2002 | Lindholm et al. | |
| 6,382,531 B1 | 5/2002 | Tracy | |
| D458,348 S | 6/2002 | Mullenmeister | |
| 6,412,711 B1 | 7/2002 | Fan | |
| D461,224 S | 8/2002 | Lobermeier | |
| D461,878 S | 8/2002 | Green et al. | |
| 6,450,425 B1 | 9/2002 | Chen | |
| 6,454,186 B2 | 9/2002 | Haverstraw et al. | |
| 6,463,658 B1 | 10/2002 | Larsson | |
| 6,464,265 B1 | 10/2002 | Mikol | |
| D465,552 S | 11/2002 | Tse | |
| D465,553 S | 11/2002 | Singtoroj | |
| 6,484,952 B2 | 11/2002 | Koren | |
| D468,800 S | 1/2003 | Tse | |
| D469,165 S | 1/2003 | Lim | |
| 6,502,796 B1 | 1/2003 | Wales | |
| 6,508,415 B2 | 1/2003 | Wang | |
| 6,511,001 B1 | 1/2003 | Huang | |
| D470,219 S | 2/2003 | Schweitzer | |
| 6,516,070 B2 | 2/2003 | Macey | |
| D471,253 S | 3/2003 | Tse | |
| D471,953 S | 3/2003 | Colligan et al. | |
| 6,533,194 B2 | 3/2003 | Marsh et al. | |
| 6,537,455 B2 | 3/2003 | Farley | |
| D472,958 S | 4/2003 | Ouyoung | |
| 6,550,697 B2 | 4/2003 | Lai | |
| 6,585,174 B1 | 7/2003 | Huang | |
| 6,595,439 B1 | 7/2003 | Chen | |
| 6,607,148 B1 | 8/2003 | Marsh et al. |
| 6,611,971 B1 | 9/2003 | Antoniello et al. |
| 6,637,676 B2 | 10/2003 | Zieger et al. |
| 6,641,057 B2 | 11/2003 | Thomas et al. |
| D483,837 S | 12/2003 | Fan |
| 6,659,117 B2 | 12/2003 | Gilmore |
| 6,659,372 B2 | 12/2003 | Marsh et al. |
| D485,887 S | 1/2004 | Luettgen et al. |
| D486,888 S | 2/2004 | Lobermeier |
| 6,691,338 B2 | 2/2004 | Zieger |
| 6,691,933 B1 | 2/2004 | Bosio |
| D487,301 S | 3/2004 | Haug et al. |
| D487,498 S | 3/2004 | Blomstrom |
| 6,701,953 B2 | 3/2004 | Agosta |
| 6,715,699 B1 | 4/2004 | Greenberg et al. |
| D489,798 S | 5/2004 | Hunt |
| D490,498 S | 5/2004 | Golichowski |
| 6,736,336 B2 | 5/2004 | Wong |
| 6,739,523 B2 | 5/2004 | Haverstraw et al. |
| 6,739,527 B1 | 5/2004 | Chung |
| D492,004 S | 6/2004 | Haug et al. |
| D492,007 S | 6/2004 | Kollmann et al. |
| 6,742,725 B1 | 6/2004 | Fan |
| D493,208 S | 7/2004 | Lin |
| D493,864 S | 8/2004 | Haug et al. |
| D494,655 S | 8/2004 | Lin |
| D494,661 S | 8/2004 | Zieger et al. |
| D495,027 S | 8/2004 | Mazzola |
| 6,776,357 B1 | 8/2004 | Naito |
| 6,789,751 B1 | 9/2004 | Fan |
| D496,987 S | 10/2004 | Glunk |
| D497,974 S | 11/2004 | Haug et al. |
| D498,514 S | 11/2004 | Haug et al. |
| D500,121 S | 12/2004 | Blomstrom |
| D500,549 S | 1/2005 | Blomstrom |
| D501,242 S | 1/2005 | Blomstrom |
| D502,760 S | 3/2005 | Zieger et al. |
| D502,761 S | 3/2005 | Zieger et al. |
| D503,211 S | 3/2005 | Lin |
| 6,863,227 B2 | 3/2005 | Wollenberg et al. |
| 6,869,030 B2 | 3/2005 | Blessing et al. |
| D503,774 S | 4/2005 | Zieger |
| D503,775 S | 4/2005 | Zieger |
| D503,966 S | 4/2005 | Zieger |
| 6,899,292 B2 | 5/2005 | Titinet |
| D506,243 S | 6/2005 | Wu |
| D507,037 S | 7/2005 | Wu |
| 6,935,581 B2 | 8/2005 | Titinet |
| D509,280 S | 9/2005 | Bailey et al. |
| D509,563 S | 9/2005 | Bailey et al. |
| D510,123 S | 9/2005 | Tsai |
| D511,809 S | 11/2005 | Haug et al. |
| D512,119 S | 11/2005 | Haug et al. |
| 6,981,661 B1 | 1/2006 | Chen |
| D516,169 S | 2/2006 | Wu |
| 7,000,854 B2 | 2/2006 | Malek et al. |
| 7,004,409 B2 | 2/2006 | Okubo |
| 7,004,410 B2 | 2/2006 | Li |
| D520,109 S | 5/2006 | Wu |
| 7,040,554 B2 | 5/2006 | Drennow |
| 7,048,210 B2 | 5/2006 | Clark |
| 7,055,767 B2 | 6/2006 | Ko |
| 7,070,125 B2 | 7/2006 | Williams et al. |
| 7,077,342 B2 | 7/2006 | Lee |
| D527,440 S | 8/2006 | Macan |
| 7,093,780 B1 | 8/2006 | Chung |
| 7,097,122 B1 | 8/2006 | Farley |
| D528,631 S | 9/2006 | Gillette et al. |
| 7,100,845 B1 | 9/2006 | Hsieh |
| 7,111,798 B2 | 9/2006 | Thomas et al. |
| D530,389 S | 10/2006 | Genslak et al. |
| D530,392 S | 10/2006 | Tse |
| D531,259 S | 10/2006 | Hsieh |
| 7,114,666 B2 | 10/2006 | Luettgen et al. |
| D533,253 S | 12/2006 | Luettgen et al. |
| D534,239 S | 12/2006 | Dingler et al. |
| D535,354 S | 1/2007 | Wu |
| D536,060 S | 1/2007 | Sadler |
| 7,156,325 B1 | 1/2007 | Chen |

| | | | | | | |
|---|---|---|---|---|---|---|
| D538,391 S | 3/2007 | Mazzola | | 2011/0000982 A1 | 1/2011 | Luettgen et al. |
| D540,424 S | 4/2007 | Kirar | | 2011/0000983 A1 | 1/2011 | Chang |
| D540,425 S | 4/2007 | Endo et al. | | 2011/0011953 A1 | 1/2011 | Macan et al. |
| D540,426 S | 4/2007 | Cropelli | | | | |
| D540,427 S | 4/2007 | Bouroullec et al. | | FOREIGN PATENT DOCUMENTS | | |
| D542,391 S | 5/2007 | Gilbert | | CH | 234284 | 3/1963 |
| D542,393 S | 5/2007 | Haug et al. | | DE | 352813 | 5/1922 |
| 7,229,031 B2 | 6/2007 | Schmidt | | DE | 848627 | 9/1952 |
| 7,243,863 B2 | 7/2007 | Glunk | | DE | 854100 | 10/1952 |
| 7,246,760 B2 | 7/2007 | Marty et al. | | DE | 2360534 | 6/1974 |
| D552,713 S | 10/2007 | Rexach | | DE | 2806093 | 8/1979 |
| 7,278,591 B2 | 10/2007 | Clearman et al. | | DE | 3107808 | 9/1982 |
| D556,295 S | 11/2007 | Genord et al. | | DE | 3246327 | 6/1984 |
| 7,299,510 B2 | 11/2007 | Tsai | | DE | 3440901 | 7/1985 |
| D557,763 S | 12/2007 | Schonherr et al. | | DE | 3706320 | 3/1988 |
| D557,764 S | 12/2007 | Schonherr et al. | | DE | 8804236 | 6/1988 |
| D557,765 S | 12/2007 | Schonherr et al. | | DE | 4034695 | 5/1991 |
| D558,301 S | 12/2007 | Hoernig | | DE | 19608085 | 9/1996 |
| 7,303,151 B2 | 12/2007 | Wu | | DE | 102006032017 | 1/2008 |
| D559,357 S | 1/2008 | Wang et al. | | EP | 0167063 | 6/1985 |
| D559,945 S | 1/2008 | Patterson et al. | | EP | 0478999 | 4/1992 |
| D560,269 S | 1/2008 | Tse | | EP | 0514753 | 11/1992 |
| D562,937 S | 2/2008 | Schonherr et al. | | EP | 0435030 | 7/1993 |
| D562,938 S | 2/2008 | Blessing | | EP | 0617644 | 10/1994 |
| D562,941 S | 2/2008 | Pan | | EP | 0683354 | 11/1995 |
| 7,331,536 B1 | 2/2008 | Zhen et al. | | EP | 0687851 | 12/1995 |
| 7,347,388 B2 | 3/2008 | Chung | | EP | 0695907 | 2/1996 |
| D565,699 S | 4/2008 | Berberet | | EP | 0700729 | 3/1996 |
| D565,703 S | 4/2008 | Lammel et al. | | EP | 0719588 | 7/1996 |
| D566,228 S | 4/2008 | Neagoe | | EP | 0721082 | 7/1996 |
| D566,229 S | 4/2008 | Rexach | | EP | 0733747 | 9/1996 |
| D567,328 S | 4/2008 | Spangler et al. | | EP | 0808661 | 11/1997 |
| 7,360,723 B2 | 4/2008 | Lev | | EP | 0726811 | 1/1998 |
| 7,364,097 B2 | 4/2008 | Okuma | | EP | 2164642 | 10/2010 |
| 7,374,112 B1 | 5/2008 | Bulan et al. | | EP | 2260945 | 12/2010 |
| 7,384,007 B2 | 6/2008 | Ho | | FR | 538538 | 6/1922 |
| D577,099 S | 9/2008 | Leber | | FR | 873808 | 7/1942 |
| D577,793 S | 9/2008 | Leber | | FR | 1039750 | 10/1953 |
| D580,012 S | 11/2008 | Quinn et al. | | FR | 1098836 | 8/1955 |
| D580,513 S | 11/2008 | Quinn et al. | | FR | 2596492 | 10/1987 |
| D581,014 S | 11/2008 | Quinn et al. | | FR | 2695452 | 3/1994 |
| 7,503,345 B2 | 3/2009 | Paterson et al. | | GB | 3314 | 0/1914 |
| 7,520,448 B2 | 4/2009 | Luettgen et al. | | GB | 10086 | 0/1894 |
| 7,537,175 B2 | 5/2009 | Miura et al. | | GB | 129812 | 7/1919 |
| 7,832,662 B2 | 11/2010 | Gallo | | GB | 204600 | 10/1923 |
| 2003/0062426 A1 | 4/2003 | Gregory et al. | | GB | 634483 | 3/1950 |
| 2004/0118949 A1 | 6/2004 | Marks | | GB | 971866 | 10/1964 |
| 2004/0244105 A1 | 12/2004 | Chen | | GB | 1111126 | 4/1968 |
| 2005/0001072 A1 | 1/2005 | Bolus et al. | | GB | 2066074 | 1/1980 |
| 2005/0082824 A1 | 4/2005 | Luettgen et al. | | GB | 2066704 | 7/1981 |
| 2005/0098661 A1 * | 5/2005 | Lev ............... 239/550 | | GB | 2068778 | 8/1981 |
| 2005/0284967 A1 | 12/2005 | Korb et al. | | GB | 2121319 | 12/1983 |
| 2006/0016908 A1 | 1/2006 | Chung | | GB | 2155984 | 10/1985 |
| 2006/0016913 A1 | 1/2006 | Lo | | GB | 2156932 A | 10/1985 |
| 2006/0043214 A1 | 3/2006 | Macan et al. | | GB | 2199771 | 7/1988 |
| 2006/0060678 A1 | 3/2006 | Mazzola | | GB | 2298595 | 11/1996 |
| 2006/0102747 A1 | 5/2006 | Ho | | GB | 2337471 | 11/1999 |
| 2006/0157590 A1 | 7/2006 | Clearman et al. | | IT | 327400 | 7/1935 |
| 2006/0163391 A1 | 7/2006 | Schorn | | IT | 350359 | 7/1937 |
| 2006/0219822 A1 | 10/2006 | Miller et al. | | IT | 563459 | 5/1957 |
| 2006/0283986 A1 | 12/2006 | Chung | | JP | S63-181459 | 11/1988 |
| 2007/0040054 A1 | 2/2007 | Farzan | | JP | H2-78660 | 6/1990 |
| 2007/0200013 A1 | 8/2007 | Hsiao | | JP | 4062238 | 2/1992 |
| 2007/0246577 A1 | 10/2007 | Leber | | JP | 4146708 | 5/1992 |
| 2007/0252021 A1 | 11/2007 | Cristina | | NL | 8902957 | 6/1991 |
| 2007/0272770 A1 | 11/2007 | Leber et al. | | WO | WO93/12894 | 7/1993 |
| 2008/0073449 A1 | 3/2008 | Haynes et al. | | WO | WO93/25839 | 12/1993 |
| 2008/0083844 A1 | 4/2008 | Leber et al. | | WO | WO96/00617 | 1/1996 |
| 2008/0111004 A1 | 5/2008 | Huffman | | WO | WO98/30336 | 7/1998 |
| 2008/0156897 A1 | 7/2008 | Leber | | WO | WO99/59726 | 11/1999 |
| 2008/0156902 A1 | 7/2008 | Luettgen et al. | | WO | WO00/10720 | 3/2000 |
| 2008/0156903 A1 | 7/2008 | Leber | | WO | WO2010/004593 | 1/2010 |
| 2008/0223957 A1 | 9/2008 | Schorn | | | | |
| 2008/0272203 A1 | 11/2008 | Leber | | OTHER PUBLICATIONS | | |
| 2008/0272591 A1 | 11/2008 | Leber | | | | |
| 2009/0200404 A1 | 8/2009 | Cristina | | Color Copy, Labeled 1B, Gemlo, available at least as early as Dec. 2, 1998. | | |
| 2009/0218420 A1 | 9/2009 | Mazzola | | | | |
| 2009/0307836 A1 | 12/2009 | Blattner et al. | | | | |
| 2010/0320290 A1 | 12/2010 | Luettgen et al. | | * cited by examiner | | |

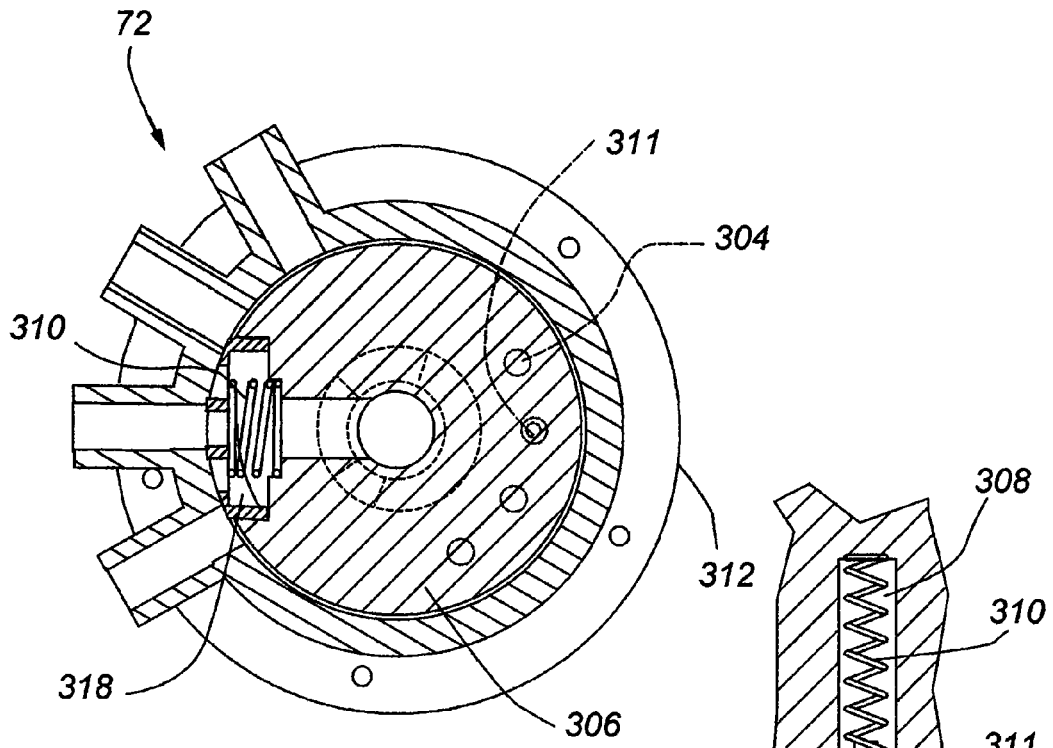
Fig. 15
Fig. 14
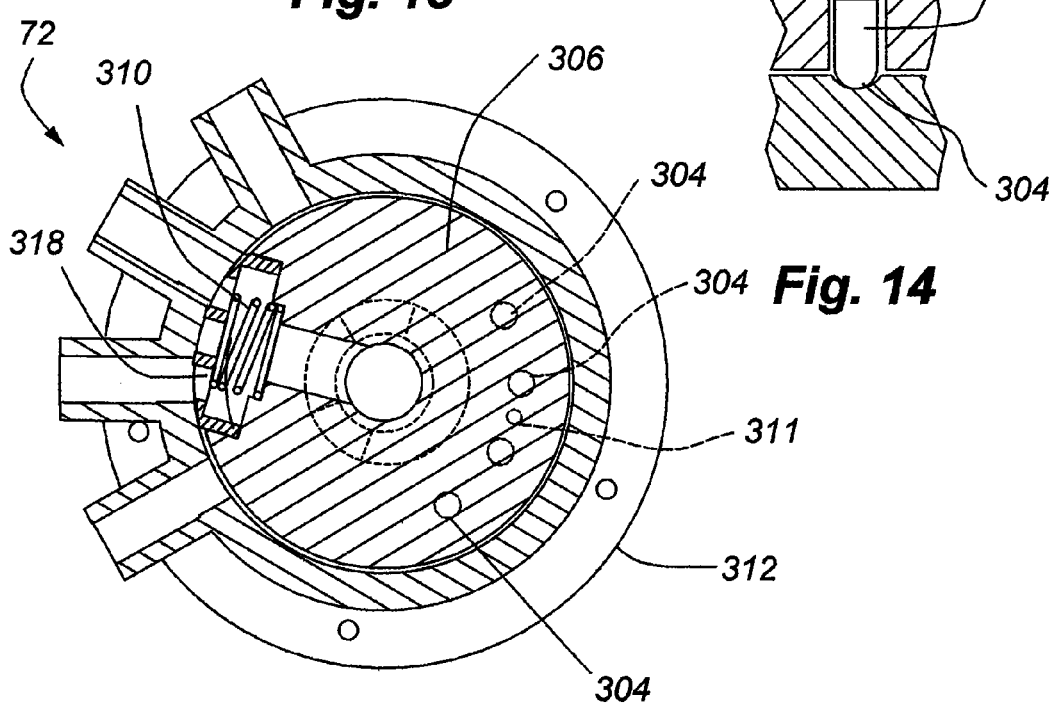
Fig. 16

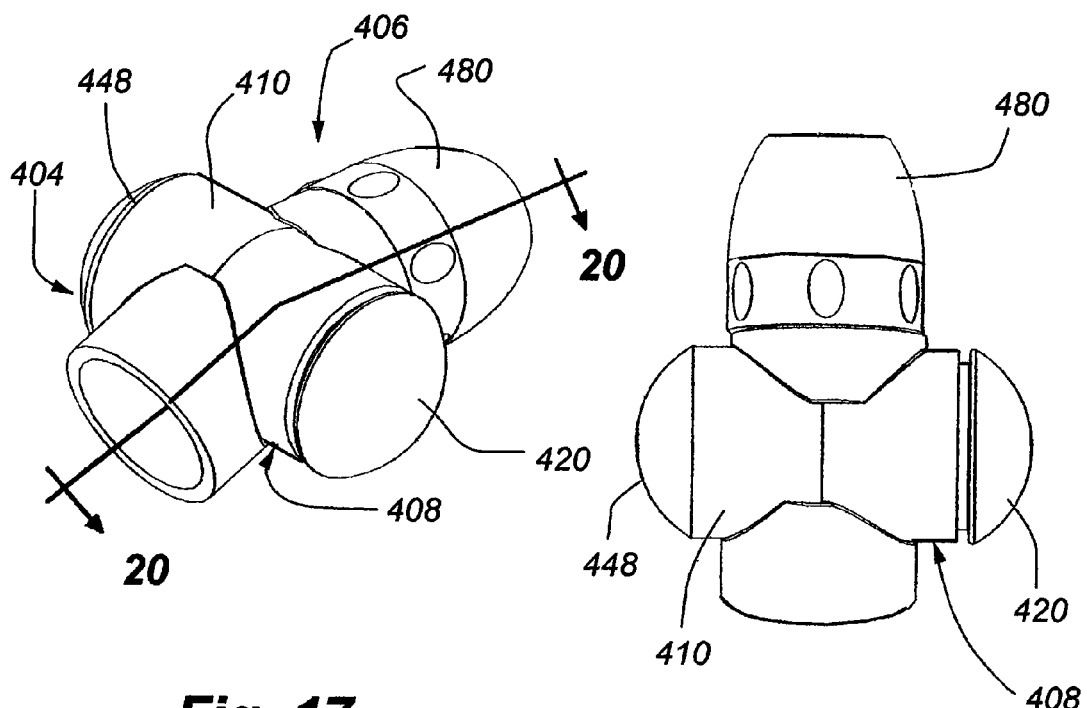
Fig. 17
Fig. 19
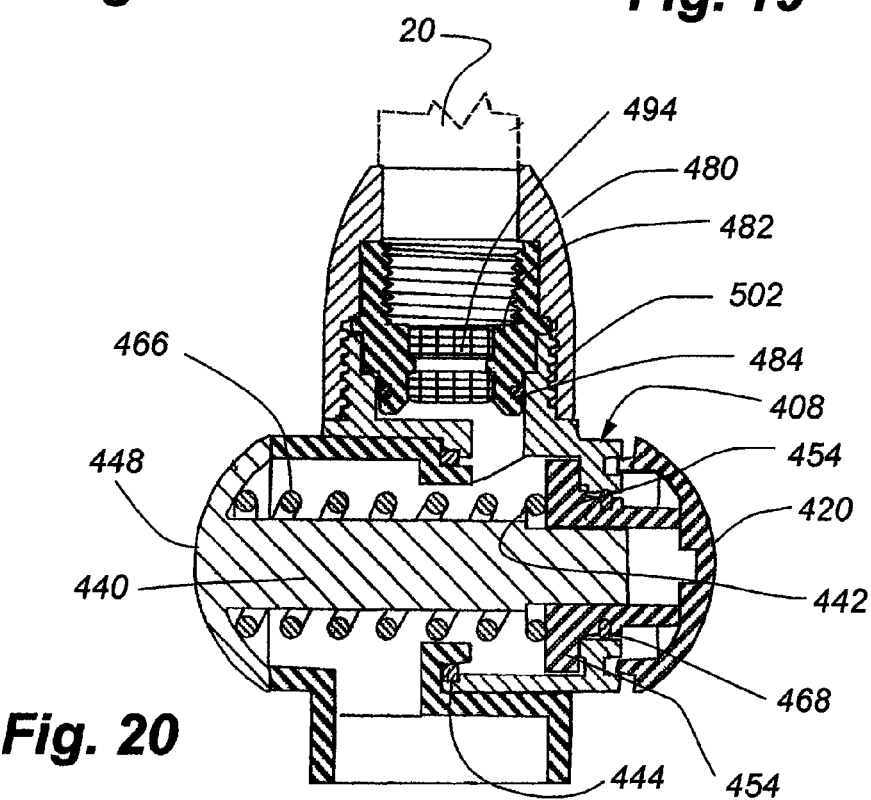
Fig. 20

_US 8,020,787 B2_

SHOWERHEAD SYSTEM

CROSS REFERENCE TO RELATED APPLICATIONS

The present application is a non-provisional application claiming priority to co-pending provisional application 60/867,778 titled "Showerhead System," filed on Nov. 29, 2006 and co-pending provisional application 60/882,441 titled "Low Speed Pulsating Showerhead," filed on Dec. 28, 2006, which are hereby incorporated by reference in their entirety, as if fully described herein.

FIELD OF THE INVENTION

The present invention generally relates to a showerhead system and more particularly to a showerhead system and a support structure configuration therefor.

BACKGROUND OF THE INVENTION

With an increase in the popularity of showers, the demand for showerhead assemblies has also increased. Over the years, some designs have been used in certain showerhead assemblies. For example, one design may include a control mode selector located adjacent to a head portion of the showerhead system. When a user actuates a control knob or lever to transition from a first spray mode to a second spray mode, the entire showerhead system may be inadvertently repositioned. Another design of some showerhead assemblies may include placing an adjusting device used to reposition a showerhead system relative to a connecting shower pipe. For example, some showerhead assemblies allow a user to reposition the showerhead by placing the adjustment device at an elbow of a support structure or adjacent to a showerhead. However, the locations of the adjustment device itself often require adjustment of multiple pieces to reposition the showerhead or are located in ergonomically unfriendly positions for a user. Still another design may result in some showerhead assemblies having a support structure that may not maintain a fixed position of a showerhead system under high water pressures.

Therefore, a need exists in the art for a showerhead system that provides an improved support structure for a showerhead.

SUMMARY OF THE INVENTION

In one embodiment, the present invention provides a showerhead system. The showerhead system may include a support structure and a showerhead coupled to the support structure. The support structure may be adapted to couple to a shower pipe to receive water flow therefrom. The support structure may include a control mode selector, a first fluid channel, and a second fluid channel. The control mode selector may actuate between a first position that directs the water flow to the first fluid channel and a second position that directs the water flow to at least the second fluid channel. The showerhead system may receive and distribute the water flow to a user in a first spray mode associated with the first fluid channel or a second spray mode associated with at least the second fluid channel based on a selected position of the control mode selector. Additionally, the control mode selector may be located adjacent to the shower pipe such that it may be adjustably positioned relative to the shower pipe.

In another embodiment, the showerhead system may include a body portion and a head portion coupled to one end of the body portion. The other end of the body portion may be coupled to a shower pipe to receive water flow therefrom. The body portion may include a first support structure and a second support structure. At least one of the first support structure and the second support may include at least one fluid channel configured to receive and transport received water flow from the shower pipe. After the water flow is transported by the fluid channel, the head portion may receive the water flow to distribute to a user.

In still another embodiment, the showerhead system may include a head portion and a support structure having an adjustment mechanism. The head portion may receive water flow to distribute to a user. One end of the support structure may be coupled to the head portion; the other end of the support structure may be coupled to a shower pipe to receive the water flow therefrom. The support structure may transport the water flow to the head portion. The adjustment mechanism may be located adjacent to the shower pipe to allow pivotal movement along at least one axis of the support structure at the shower pipe. The adjustment mechanism may also positively lock the support structure in a user-adjusted position relative to the shower pipe about an axis.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 14 is a sectional view of a portion of the control mode selector in FIG. 12 along line 14-14.

FIG. 15 is a sectional view of the control mode selector in FIG. 12 along line 15-15 with a detent pin in a spray mode position.

FIG. 16 is a representative-sectional view of the control mode selector in FIG. 12 with the detent pin in a different spray mode position.

FIG. 17 is a perspective view of an alternative embodiment of an adjustment device of the present invention

FIG. 19 is a side view of the adjustment device in FIG. 18 showing a button biased outwardly in a locked position.

FIG. 20 is a side-sectional view of the adjustment device in FIG. 17 along line 20-20 showing the button biased outwardly in the locked position.

DETAILED DESCRIPTION OF THE INVENTION

Figure 1:
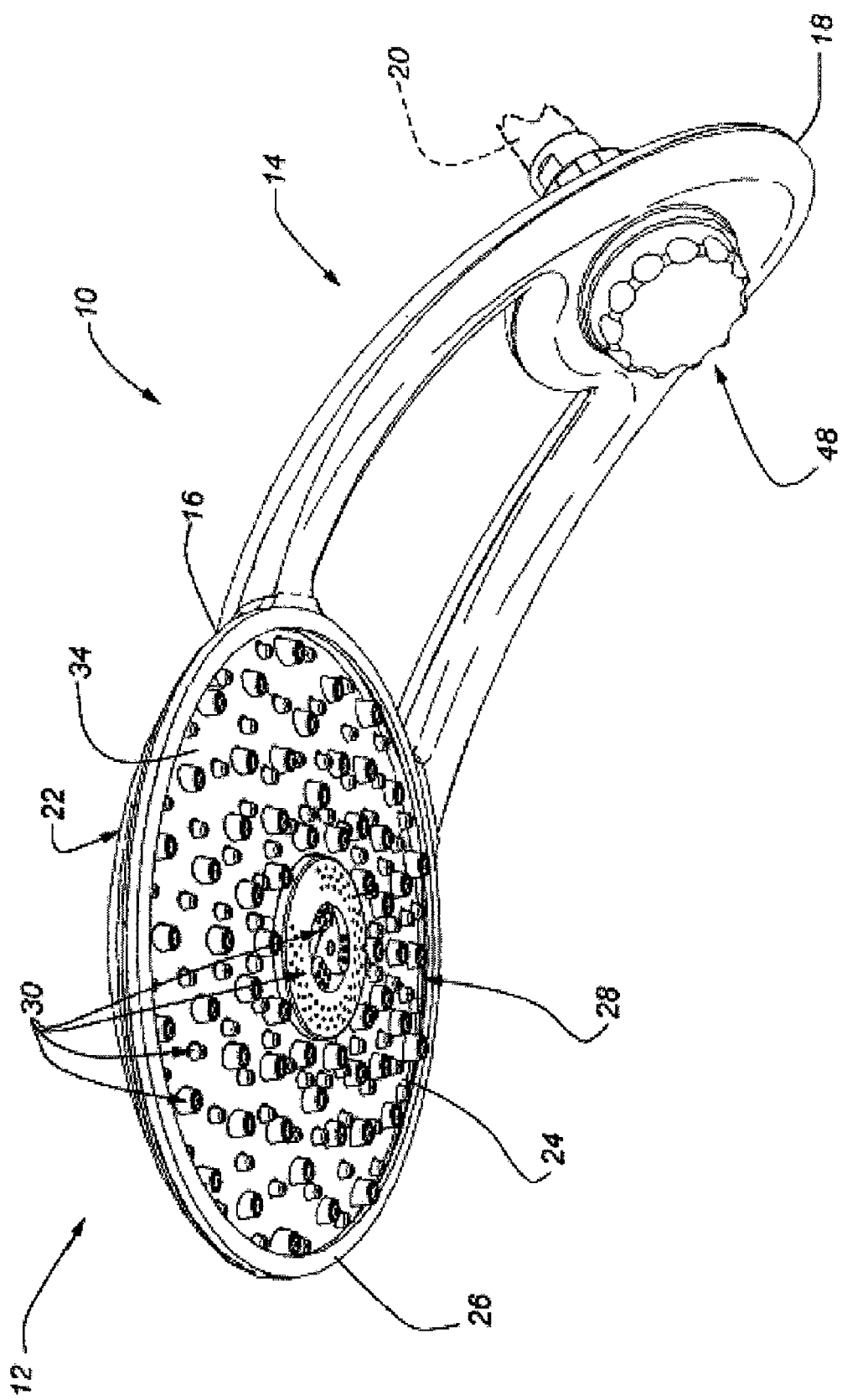
FIG. 1 is a perspective view of an exemplary showerhead system.

With reference to the drawings, an exemplary showerhead system is constructed in accordance with the teachings of the present invention and is generally indicated by reference numeral 10. The exemplary showerhead system may include a body support structure having dual arm support structures, a spray control mode selector located adjacent to the shower pipe, an adjustment mechanism located adjacent to the shower pipe or any combination of the above. Additionally, the showerhead system may include a control mode selector coupled to a plurality of water channels that may provide separate spray modes for a single showerhead, multiple showerheads, or a combination thereof. Still another aspect of the showerhead system may include an adjustment device coupling the showerhead system to the shower pipe such that the showerhead system may pivot in a single direction or in multiple directions. Yet another aspect of the showerhead system may include a control mode selector directing the water flow to one or more outlets, where the outlets may be arranged so that their axes lie on a single plane or multiple planes.

Figure 2:
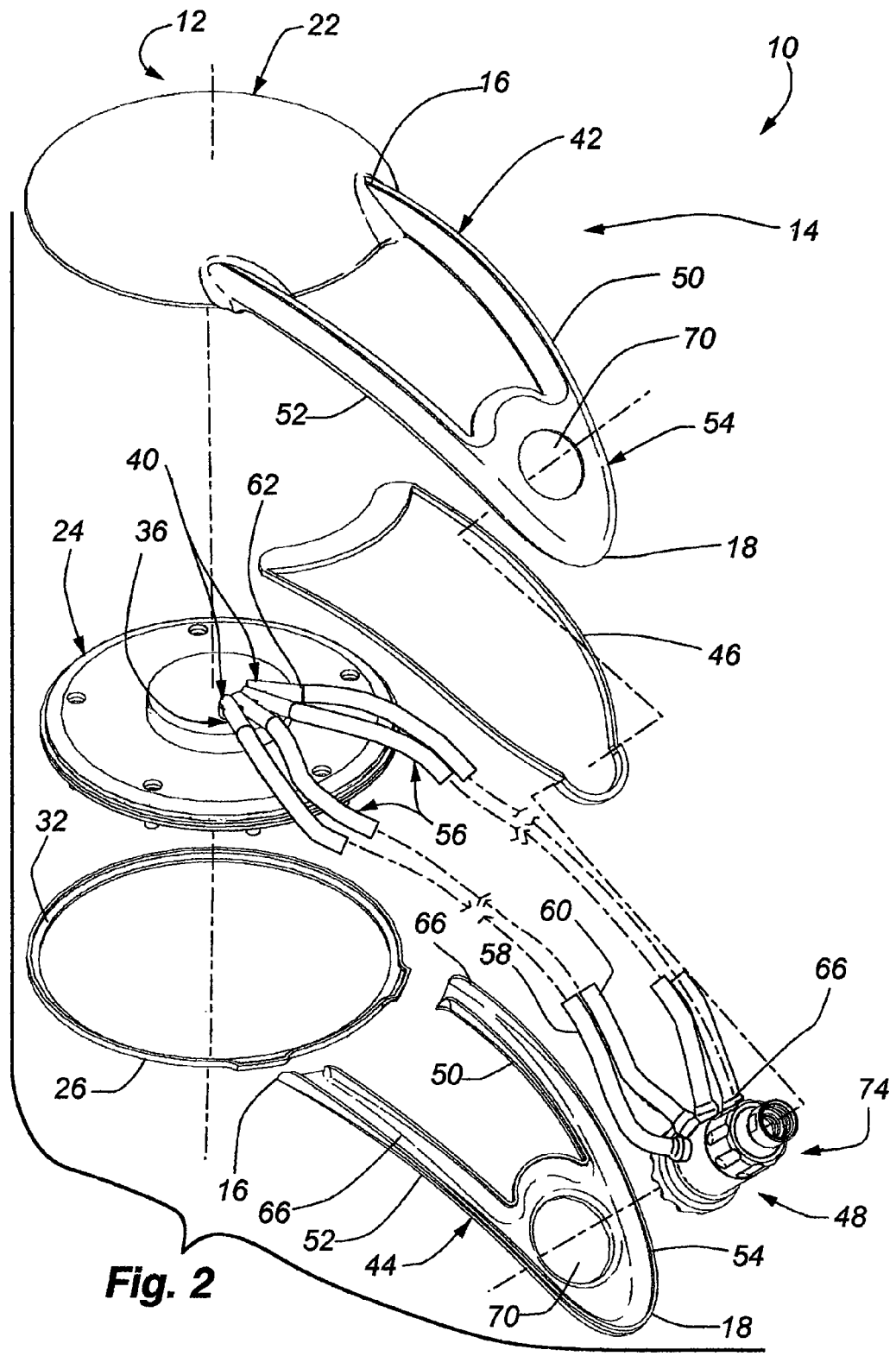
FIG. 2 is an exploded view of the showerhead system in FIG. 1.

The following paragraphs provide a more detailed description of the present invention. FIG. 1 is a perspective view of an exemplary showerhead system 10. FIG. 2 is an exploded view of the showerhead system 10.

As shown in FIGS. 1 and 2, the exemplary showerhead system 10 may include a head portion 12 and a body support structure portion 14. The body portion 14 is coupled at a first end 16 to the head portion 12 and at a second end 18 to a shower pipe 20 to receive water flow therefrom. The head portion receives the water flow from the body portion to distribute to a user.

Still referring to FIGS. 1 and 2, the head portion 12 may include an upper shell portion 22, a head assembly 24, and a connecting ring or cover 26. The connecting ring 26 couples the head assembly 24 to the upper shell portion 22. A surface 28 of the head assembly defines a plurality of nozzle configurations 30 for various shower modes.

The upper shell portion 22 may be molded from a lightweight polymeric material, such as plastic, or more specifically an Acrylonitrile Butadiene Styrene (ABS) plastic or any suitable thermoplastic known to those in the art. The upper shell portion 22 and the head assembly 24 may be made from a plurality of molded pieces adapted to fit together.

As shown in FIGS. 1 and 2, the upper shell portion 22 of the head portion 12 and the head assembly 24 may be connected together using the cover 26. The cover 26 may include grooves 32 that correspond to outermost edges of flat portions 33 of the upper shell portion 22 and lower shell portion 34. The cover 26 provides for a uniform connection between the upper and the lower shell portions 22, 34 as well as helps to hold the upper and lower shell portions together.

Still referring to FIG. 2, the head assembly 24 may include any conventional head assembly that is configured to receive a water flow and distribute it to a user in one of a plurality of different spray modes. The head assembly 24 may include a fluid connecting inlet port 36 to receive the water flow from the body portion 14. The inlet port 36 directs the water flow through a water pathway to a specific set of nozzles 30 to distribute in a specific spray mode or configuration. More specifically, the head assembly 24 may include a plurality of inlet ports 40. For example, as shown in FIG. 2, the head assembly 24 includes four fluid connecting inlet ports 40 to receive and direct the water flow.

Referring to FIG. 1, the plurality of nozzle configurations 30 receive the water flow and distribute the water flow to a user. The head assembly 24 may include four specific nozzle configurations 30. Each nozzle configuration 30 may be associated with one of the inlet ports 40. Additionally, each nozzle configuration 30 distributes the water flow to a user in a different spray mode.

Again referring to FIG. 2, the body support structure portion 14 may include an upper housing 42 coupled to a lower housing 44, a gasket 46, and a control mode selector 48. The gasket 46 may be coupled between the upper and lower housings 42, 44 to seal and prevent fluid leaks and unwanted noise from occurring via the upper and lower housings 42, 44. The control mode selector 48 may be coupled to the shower pipe 20, as shown in FIG. 1, to receive the water flow therefrom.

In the exemplary embodiment, the upper housing 42 may be rigid and is an upper portion of a first arm support structure 50, a second arm support structure 52, and a base portion 54. Likewise, the lower housing 44 may be rigid and is a mating structure to the upper housing 42. The lower housing 44 is a lower portion of the first arm support structure 50, the second arm support structure 52, and the base portion 54.

The upper and lower housings 42, 44 are preferably made from a light weight polymeric material or the like, such as a plastic material or more specifically an ABS plastic, or any suitable thermoplastic known to those in the art. The upper and lower housings 42, 44 may be made from a plurality of molded pieces adapted to fit together. Additionally, the upper housing 42 and the upper shell portion 22 may be molded or welded forming a single piece or they may be separate pieces.

The upper and lower housings 42, 44 may be connected together using any coupling means including adhesives, welds, and/or fasteners. When coupled, the upper and lower housings 42, 44 form the first arm support structure 50, the second arm support structure 52, and the base portion 54.

Referring again to FIGS. 1 and 2, the first and second arm support structures 50, 52 are elongated stems that extend between the head portion 12 and the base portion 54. The first and second arm support structures 50, 52 provide a dual support structure to maintain and hold the head portion 12 in a fixed position relative to the support structure. The elongated stems may be straight, curved, or segmented straight portions offset at angles, or any suitable shape.

As shown in FIG. 2, at least one of the first and second arm support structures 50, 52 may include at least one fluid channel 56 to transport the received water flow to at least one valve 40 of the head assembly 24. More specifically, each of the first and second arm support structures 50, 52 may include a plurality of fluid channels 56. For example, the plurality of fluid channels 56 may include a first fluid channel 58 and a second fluid channel 60.

In one embodiment, the fluid channels 56 may be flexible water hoses or conduits that are seated within molded ribs 66 and/or gussets (not shown) of the first and second arm support structures 50, 52. Alternatively, the fluid channels 56 may be molded and/or welded channels formed in the upper and lower housings 42, 44. As best shown in FIG. 2, a first end 62 of each of the fluid channels 56 may be coupled to at least one inlet port 40 of the head assembly 24. A second end 64 of each of the fluid channels 46 may be coupled to the control mode selector 48.

As best seen in FIGS. 1 and 2, the base portion 54 may be located at the second end 18 of the body support structure portion 14. In the exemplary embodiment, the base portion 54 has an oblong-like shape; however, the base portion may incorporate any suitable shape. The base portion also includes an orifice or aperture 70 in which the control mode selector 48 resides.

Figure 3:
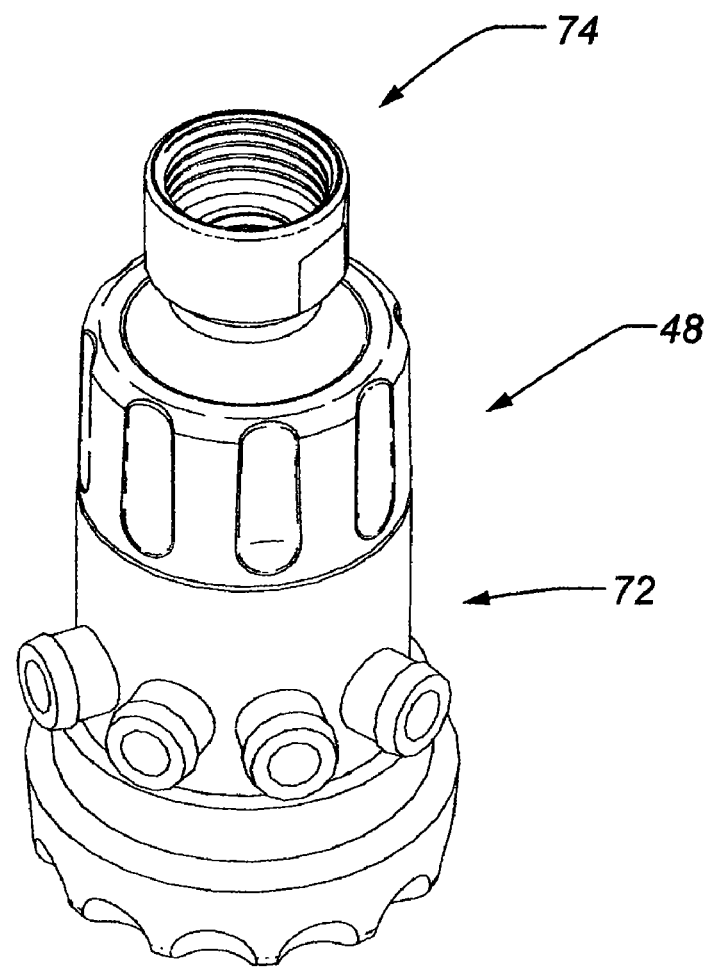
FIG. 3 is a perspective view of a control mode selector of the present invention.
Figure 4:
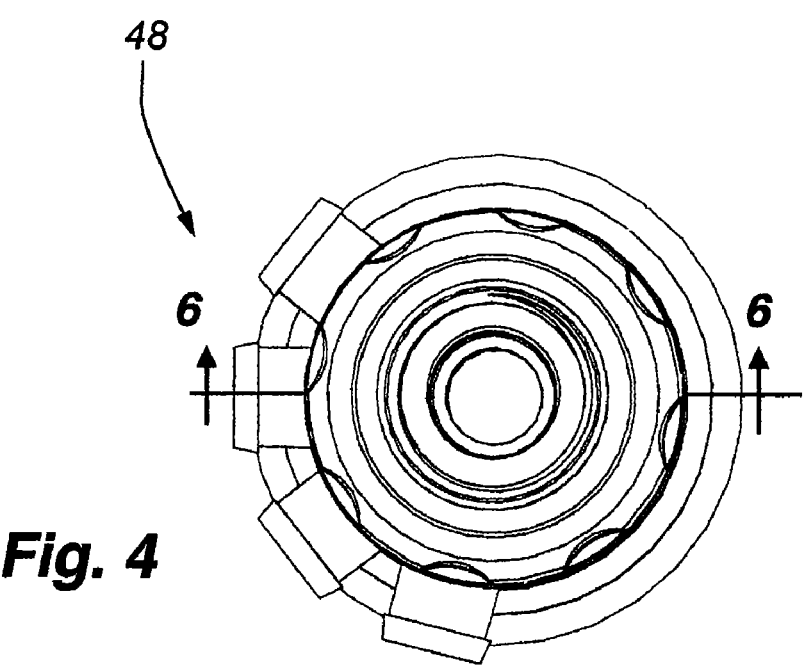
FIG. 4 is a bottom view of the control mode selector in FIG. 3.
Figure 5:
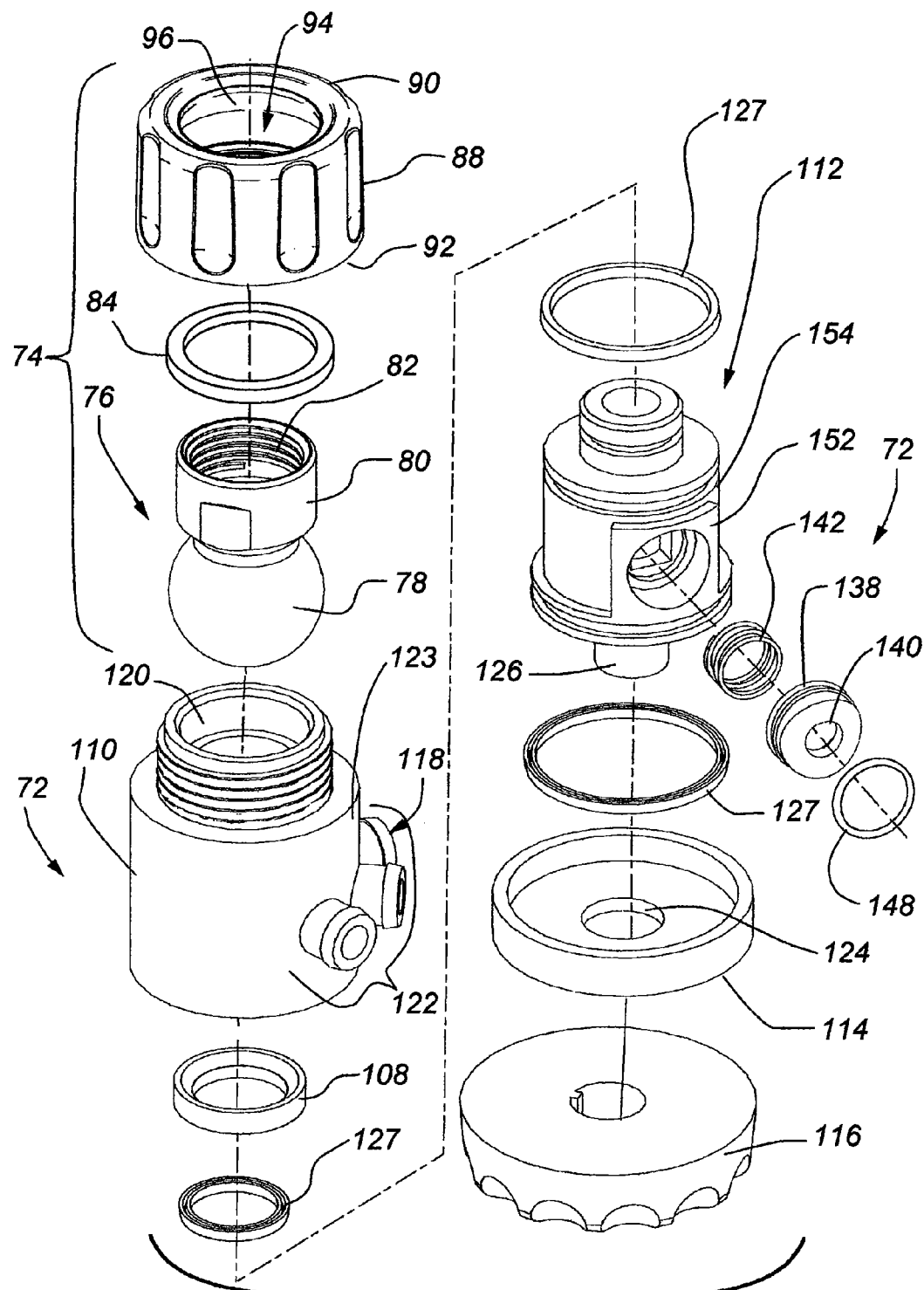
FIG. 5 is an exploded view of the control mode selector in FIG. 3.

With reference to FIGS. 3-5, a more detailed discussion of the control mode selector will now be disclosed. In FIG. 3, a perspective view of the control mode selector 48 is provided. In FIG. 4 a bottom view of the control mode selector 48 is provided. FIG. 5 is an exploded view of the control mode selector 48.

In the exemplary embodiment, the control mode selector 48 may direct the water flow to one or more fluid channels 56 for transport to the head assembly 24. As described herein, the control mode selector 48 forms part of the water passage of the water flow from the shower pipe 20 to the inlet ports 56 of the head assembly 24 for distribution to a user.

Referring the FIGS. 3 and 5, the control mode selector 48 may be constructed using several elements. The control mode selector 48 may include a fluid distributing assembly 72 and an attachment mechanism 74. The fluid distributing assembly 72 may be coupled to the attachment mechanism 74. The attachment mechanism 74 may, in turn, coupled to the shower pipe (see FIG. 1).

Figure 6:
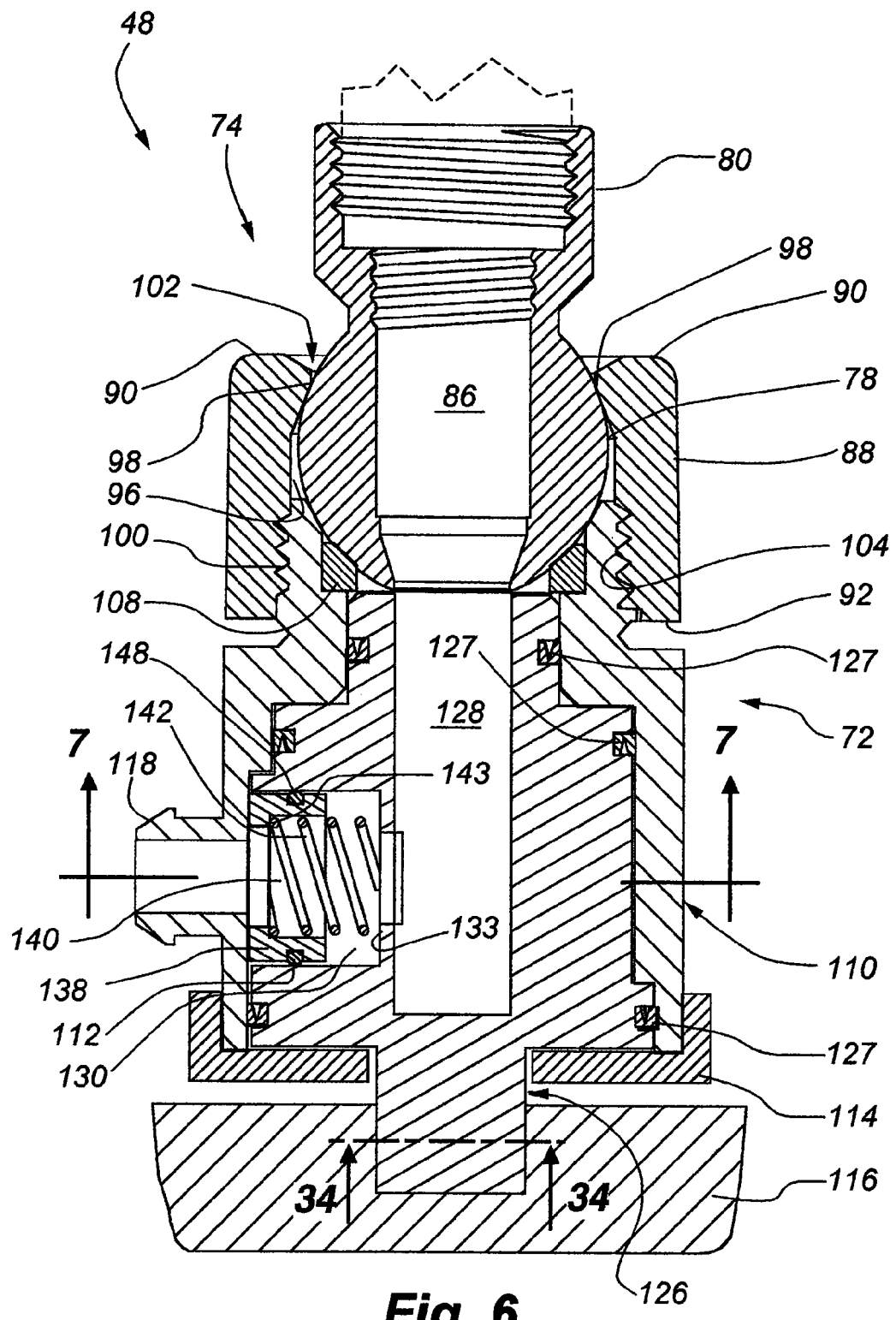
FIG. 6 is a global-sectional view of the control mode selector in FIG. 3 along line 6-6.

Now referring to FIGS. 5 and 6, the attachment mechanism 74 may include a pivot ball unit 76 that has a spherical ball shaped portion 78, a coupling portion 80 extending from the ball shaped portion 78, and a collar that may couple the pivot ball unit 76 to the fluid distributing assembly 72. The coupling portion 80 may include a threaded inner surface 82 configured to fixedly couple with the shower pipe 20, while allowing the showerhead system 10 to pivot on the ball portion 78 of the pivot ball unit 76. When the threaded inner surface 82 of the pivot ball unit 76 is screwed onto the shower pipe, the pivot ball unit 76 receives the water flow therefrom. The water flow travels through a water chamber 86 that extends a length of the pivot ball unit.

A seal (not shown) may be coupled between the threaded inner surface 82 and a shower pipe to prevent leaks from occurring between the shower pipe and the threaded portion 82.

Referring again to FIGS. 5 and 6, the collar 88 is adjustably coupled to the ball shaped portion 78. The collar 88 includes a first end 90, a second end 92, and an aperture 94 that extends from the first end 90 to the second end 92. As best shown in FIG. 6, an inner surface 96 of the aperture 94 includes an angled friction edge 98 that is located at the first end 90 and a threaded surface 100 extends from about the angled friction edge 98 to the second end 92. The angled friction edge 98 remains in contact about a lower sectional 102 of the ball shaped portion 78 of the pivot ball unit 76. The threaded surface 100 couples to a mating threaded surface 104 of the fluid distributing assembly 72.

After a user pivotally adjusts the collar 88 relative to the pivot ball unit 76 to a desired location and position, the threaded surface 100 of the collar 88 is screwed onto the mating threaded surface 82 of the fluid distributing assembly 72. This causes the angled friction edge 98 to tightly grip and press the ball shaped portion 78 of the pivot ball unit 76 against a seal 106 and a surface 108 within the fluid distributing assembly 72 to prevent the pivot ball unit from easily moving relative to the shower pipe.

Still referring to FIGS. 5 and 6, the fluid distributing assembly 72 receives the water flow from the pivot ball unit 76 and directs the water flow to at least one of the water channels 56. The fluid distributing assembly 72 may have a generally cylinder-like shape and may snuggly fit within the aperture 70 of the base portion 54 of the body support structure portion 14. The fluid distributing assembly 72 includes a distributor housing 110, a distributor spool 112 rotatably coupled within the distributor housing, an end cap 114, and a control knob 116 coupled to the distributor spool 112.

Referring primarily to FIGS. 4 and 5, the distributor housing 110 may define a central recess 120 having an exit port 118 formed through a wall of the distributor housing 110 and communicating therewith. The exit 118 may take the form of a barbed ribbed nozzle. The exit port 118 may allow fluid to pass out of the housing and into an attached water channel 56. More specifically, the distributor housing 110 may include a plurality of exit ports 122, and each exit port may be designated a specific spray mode position or nozzle configuration 30. This allows the fluid distributing assembly 72 to direct water flow to one or more nozzle configurations 30. Each spray mode position relates to a specific spray mode that will be used by the head assembly to distribute the water flow to a user. The end cap 114 fits over an end of the distributor housing to enclose the recess 120.

Still referring to FIGS. 5 and 6, the distributor spool 112 may be rotatably received in the central recess 120 of the distributor housing 110. The distributor spool 112 may have a shape that corresponds to an interior surface of the central recess 120, but nonetheless is allowed to rotate therein relative to the distributor housing 110. A stem 126 extends from the distributor spool 112 and through a central opening 124 of the end cap 114. The stem 126 may provide a means of rotating the distributor spool 112 within the recess 120. The control knob 116 may be attached to the stem 126 extending from the distributor spool 112. The control knob 116 allows a user to turn the distributor spool 112 within the distributor housing 110 to a select spray mode. The distributor spool 112 may also include a plurality of annular seals 127 positioned around its periphery to protect against water leaking out between the distributor spool and the distributor housing.

The distributor spool 112 defines a central chamber 128 extending axially along its length. The central chamber 128 forms part of a water flow path extending from the pivot ball unit 76 to a second chamber 130. The second chamber 130 may be formed to extend from the central chamber 128 to an outer surface 132 of the distributor spool 112. The second chamber 130 may be associated with the central chamber 128 through a bore 134. A bottom wall 133 of the second chamber in which the bore 134 is formed creates a shoulder 136.

Referring FIGS. 5 and 6, a valve seal 138 may be positioned in the second chamber 130. The valve seal 138 directs the water flowing through the distributing spool 112 into one of the exit ports 118 without leaking to an adjacent exit port or into the housing recess 120. The valve seal 138 may have cup-shaped with an aperture 140 formed in a base of the cup.

The valve seal 138 may be positioned in the second chamber 130 with the cup facing downwardly as shown in FIG. 5.

Figure 7:
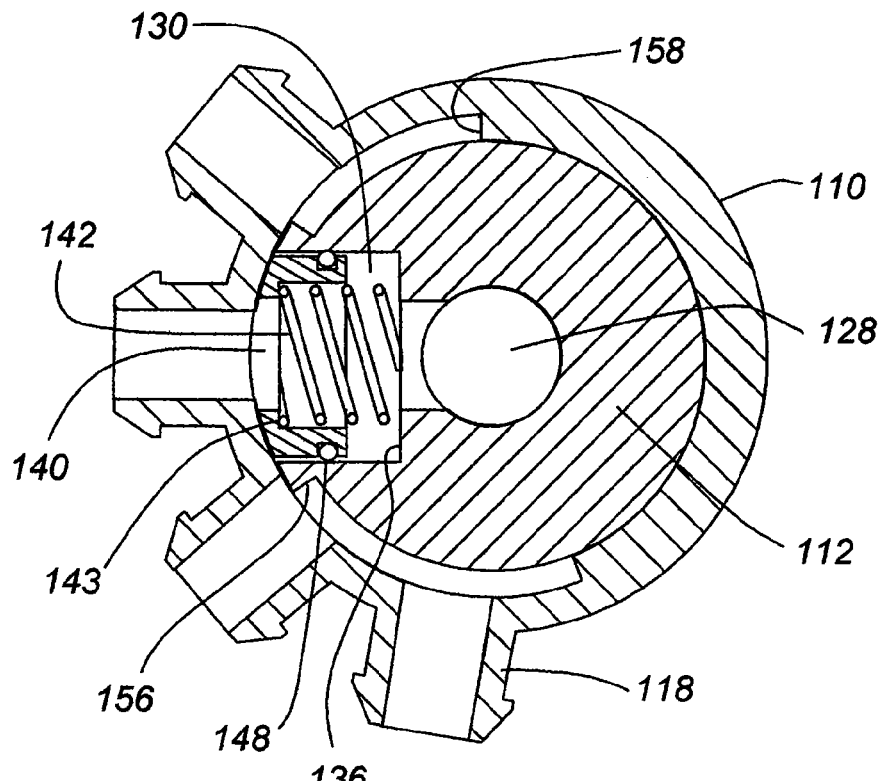
FIG. 7 is a sectional view of the control mode selector in FIG. 6 along line 7-7.
Figure 8:
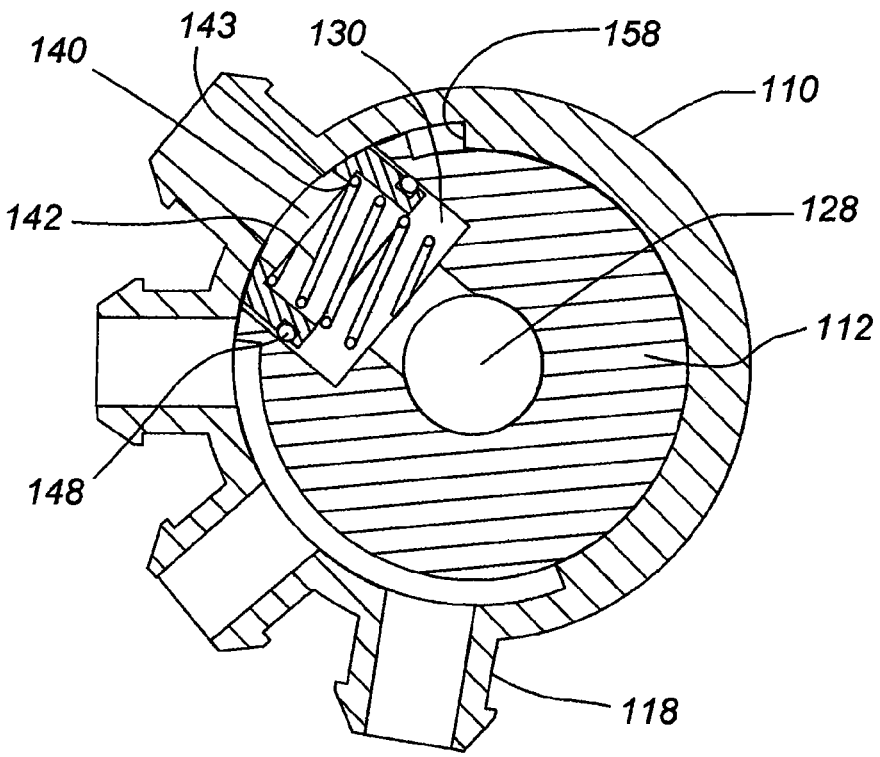
FIG. 8 is a representative-sectional view of the control mode selector in FIG. 6 with the spool in a different position.
Figure 9:
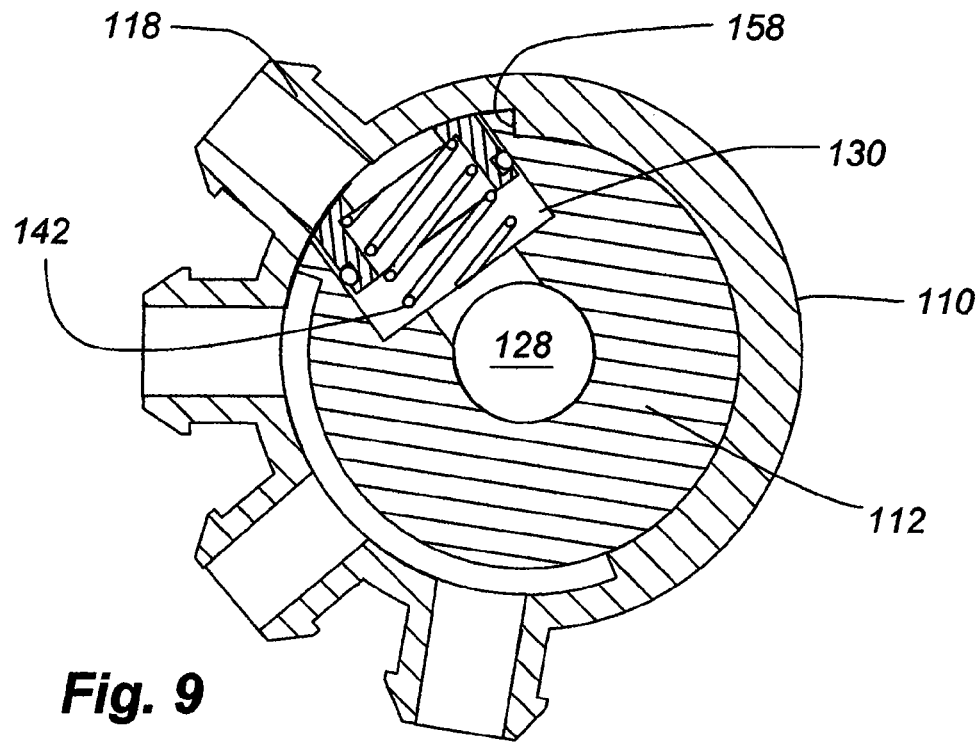
FIG. 9 is a representative-sectional view of the control mode selector in FIG. 6 with the spool in a different position.
Figure 10:
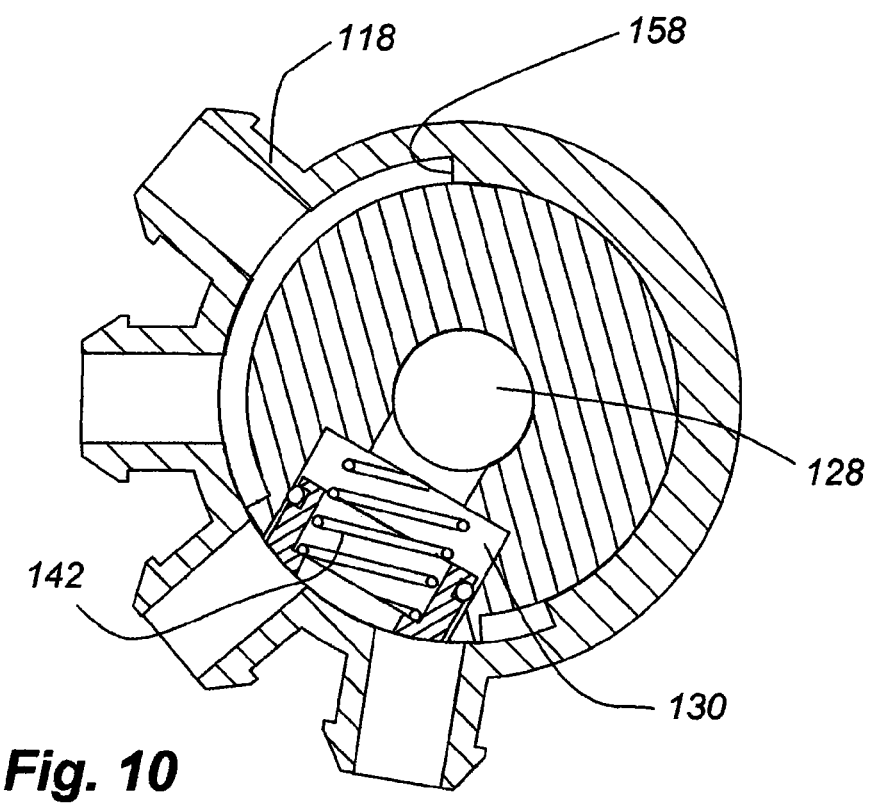
FIG. 10 is a representative-sectional view of the control mode selector in FIG. 6 with the spool in a different position.

FIGS. 7-10 show the distributor spool 112 and the distributor housing 110 of the fluid distributor assembly 72 in cross-sectional views. FIGS. 7-10 show the distributor spool 112 and the distributor housing 110 of the fluid distributor assembly 72 in cross-sectional views. More specifically, FIG. 7 is a sectional view of the control mode selector in FIG. 6 along line 7-7. FIG. 8 is a representative-sectional view of the control mode selector in FIG. 6 with the spool in a different position. FIG. 9 is a representative-sectional view of the control mode selector in FIG. 6 with the spool in a selected position. FIG. 10 is a representative-sectional view of the control mode selector in FIG. 6 with the spool in another position.

Shown best in FIGS. 7-10, a spring 142 may be positioned between the bottom wall 133 of the second chamber 130 and a base 143 of the cup-shaped valve seal 138 to bias the valve seal 138 outwardly against the inner wall of the distributor housing 110. The valve seal 138 may be made of a compliant material capable of creating a relatively watertight seal in this scenario.

An annular seal member 148 may be circumferentially positioned around a wall of the valve seal 138 to create a seal with the walls of the second chamber 130 in the distributing spool 112 to reduce leakage of water into the recess of the distributor housing 110.

As shown in FIG. 7, the second chamber 112 of the distributor spool 112 may be aligned with a specific exit port 118. In this position, the valve seal 138 may be biased by the spring 142 around the circumference of the exit port 118 to form a seal therewith. The engagement of the valve seal 138 with the inner wall of the distributor housing 110 is sufficient to create a water seal, but not so forceful as to significantly impede the rotation of the distributor spool 112 within the distributor housing. Water can flow through the central chamber 128 of the distributor spool 112, into the second chamber 130 of the distributor spool 112, through the valve seal, and through the exit port of the distributor housing.

As best shown in FIG. 5, an apron structure 152 may be formed on the outer surface of the spool around the second chamber 130. The apron structure 152 has many purposes. Referring again to FIG. 7, one purpose of the apron structure 152 may be to facilitate a close fit and allow the distributor spool 112 to sufficiently contact the sidewalls of the central recess 120 to support the rotation of the distributor spool 112 therein. Now referring to FIG. 9, another purpose of the apron structure 152 may be to form spool shoulders on opposing edges of the apron, each of which engages a corresponding recess shoulder 158 of the distributor housing 110 to limit the rotation of the distributor spool 112 within the housing recess 120 (see FIGS. 7-10).

Referring to FIGS. 7-10, the valve seal 138 may be position in a plurality of positions. Referring to FIG. 7, the valve seal 138 may be positioned adjacent a single exit port 118 of the distributor housing 110 as stated above. FIG. 8 illustrates the distributor spool 112 reoriented in another position, such that the valve seal may be transitioned from one exit port 118 to another exit port 118. As best shown in FIG. 9, the valve seal 138 may be positioned partially out of alignment with a selected port 118 to reduce the water flow through the selected exit port 118. FIG. 10 shows the distributor spool 112 reoriented in the housing recess 120 to a position between exit ports 118, which directs the water flow out of both exit ports 118.

Figure 11:
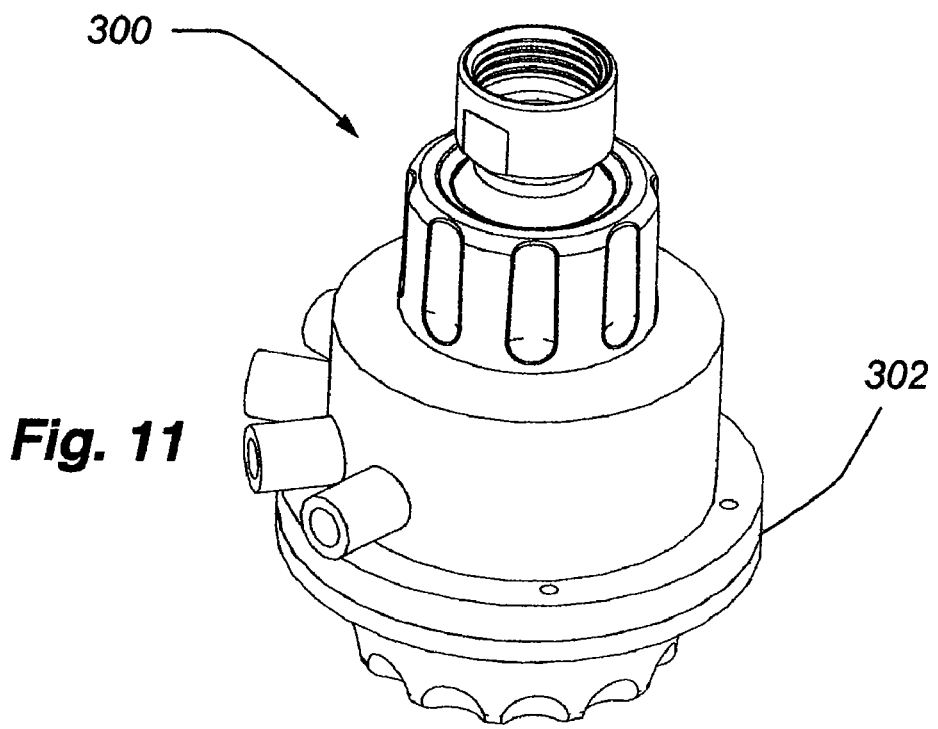
FIG. 11 is a perspective view of an alternative embodiment of an assembled control mode selector of the present invention
Figure 12:
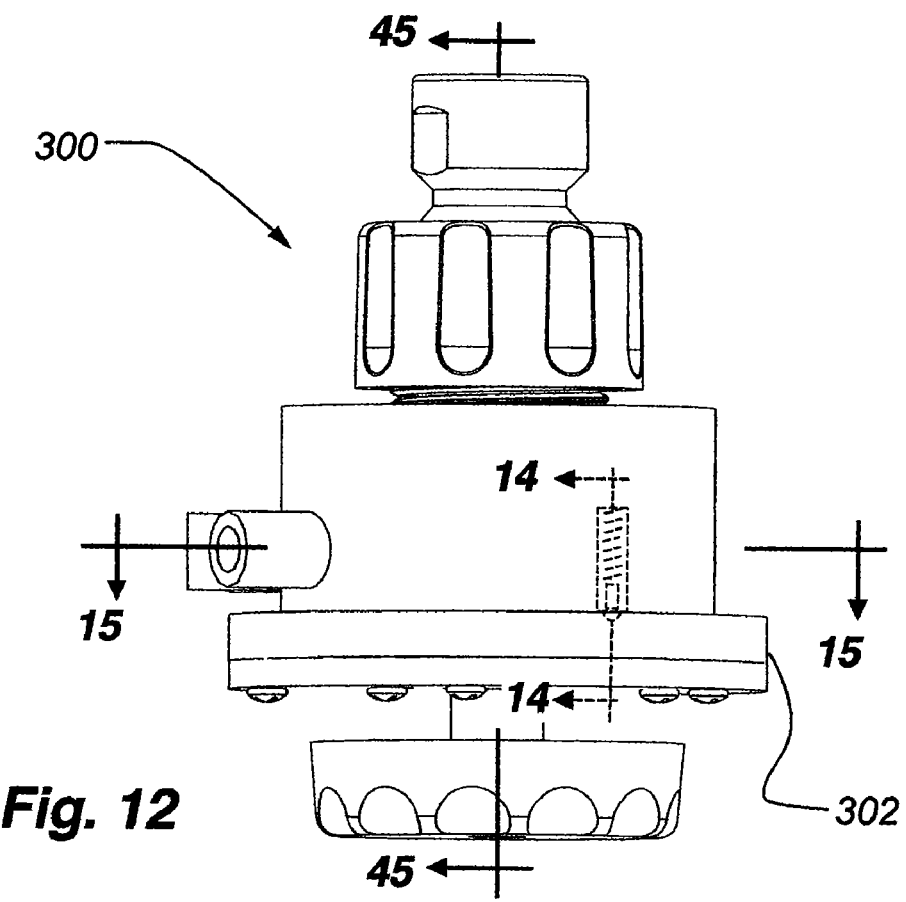
FIG. 12 is a side view of the control mode selector in FIG. 11.
Figure 13:
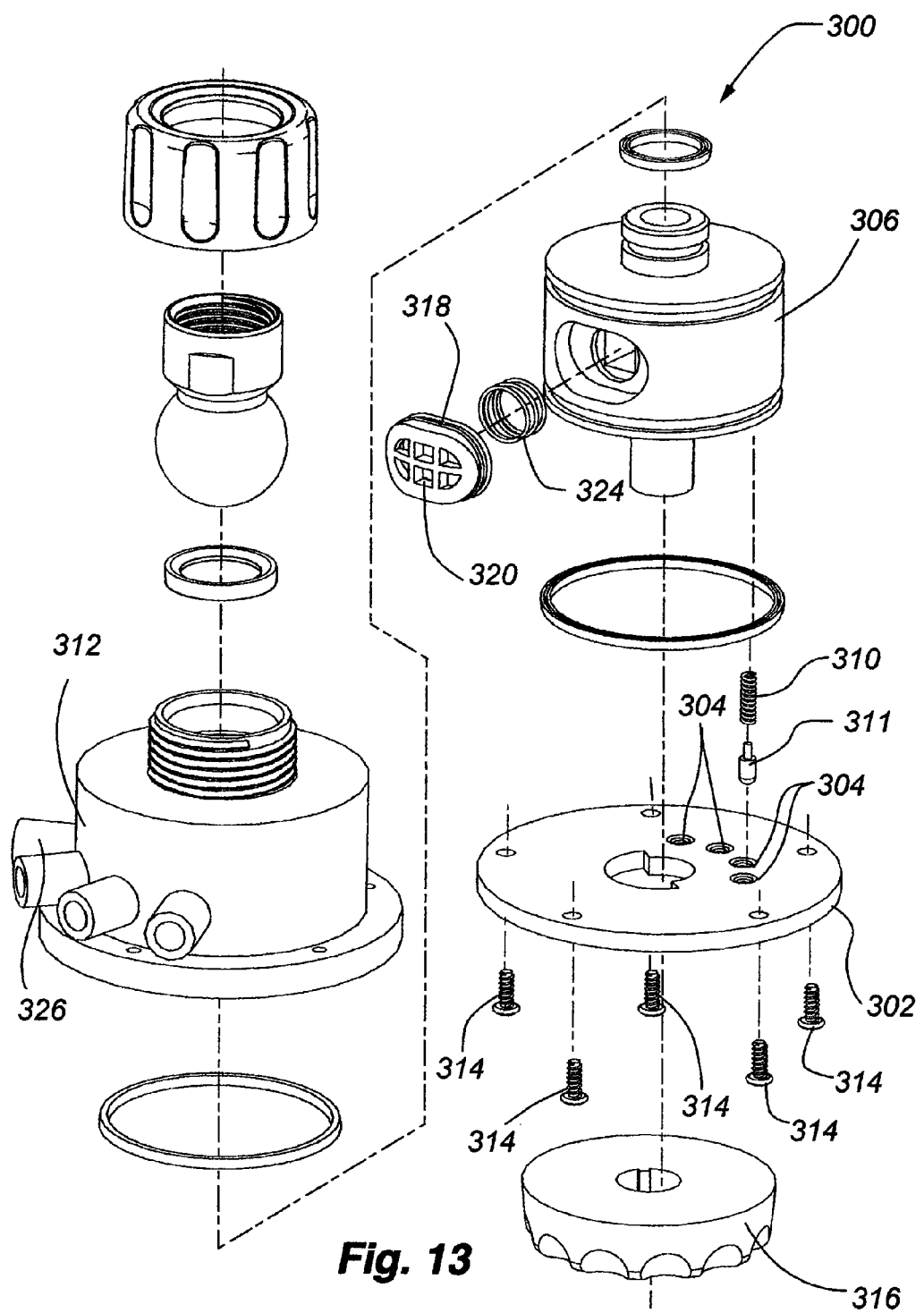
FIG. 13 is an exploded view of the control mode selector in FIG. 11

Referring to FIGS. 11-16, another embodiment of a control mode selector 300 is provided. The control mode selector 300 may include similar features and/or functions of the previously mentioned embodiment of the control mode selector 48, unless otherwise stated. FIG. 11 is a perspective view of the alternative embodiment of an assembled control mode selector 300. FIG. 12 is a side view of the control mode selector in FIG. 11. FIG. 13 is an exploded view of the control mode selector in FIG. 11. FIG. 14 is a sectional view of a portion of the control mode selector in FIG. 12 along line 14-14. FIG. 15 is a sectional view of the control mode selector in FIG. 12 along line 15-15 with a detent pin in a spray mode position. FIG. 16 is a representative-sectional view of the control mode selector in FIG. 12 with the detent pin in a different spray mode position.

Referring to FIGS. 12-13, the control mode selector 300 may include a detent characteristic to provide for a tactile feel to a user, which indicates to the user that the control knob has transitioned from one spray mode position to another spray mode position. As shown best in FIG. 13, an end cap 302 may include a plurality of recesses or detents 304, such as one for each spray mode position. Referring to FIGS. 13-14, the distributor spool 112 may include a cavity 308 having a spring 310 that biases a pin 311 against one of the recesses 304 formed in the end cap 302. In this configuration, the end cap 304 is shown attaching to a distributor housing 312 with one or more screws 314. Any type of attachment means will do, however.

As a control knob 316 is turned by a user, the distributor spool 306 rotates within the distributor housing 312. As the pin 311 leaves one detent, the spring 310 is depressed into the cavity 308. When the pin 311 reaches another detent, the pin 311 may be biased again into a selected detent. This is best shown in FIGS. 15 and 16. FIG. 15 shows the plurality of detent positions 304 and the pin 311 in dashed lines, as the pin 311 is biased outwardly in one of the detent positions. FIG. 16 shows the pin between detents where the pin is actuated into the distributor spool.

In the embodiment shown in FIG. 13, a valve seal 318 has a different shape than that shown embodiment while performing the same function of valve seal 138. In FIG. 13, the valve seal 318 is oval with a grid of openings 320 formed therethrough. An upper surface 320 of the valve seal 318 may be curved to match an inner surface 322 of the distributor housing 312 for a close, sealed fit. The valve seal 318 may be biased outwardly against the inner surface 322 of the distributor housing 312 by a spring 324. The grid of openings 320 found in the upper surface 322 has three (3) rows of three (3) openings. When centered on an exit port 326, such as in FIG. 15, the outer two column openings on either end of the valve seal are closed. Water then flows only through a portion of the exit port aligned with the valve seal.

In transition from one exit port 326 to the next, the valve seal 318 moves through the position shown in FIG. 16. In this position, the outer two openings on either end of the valve seal are aligned with adjacent outlet ports and the central two openings are closed by being aligned with the wall of the housing. This allows some flow of water to different modes during the transition between modes. The user can then identify when a next mode being selected.

Figure 18:
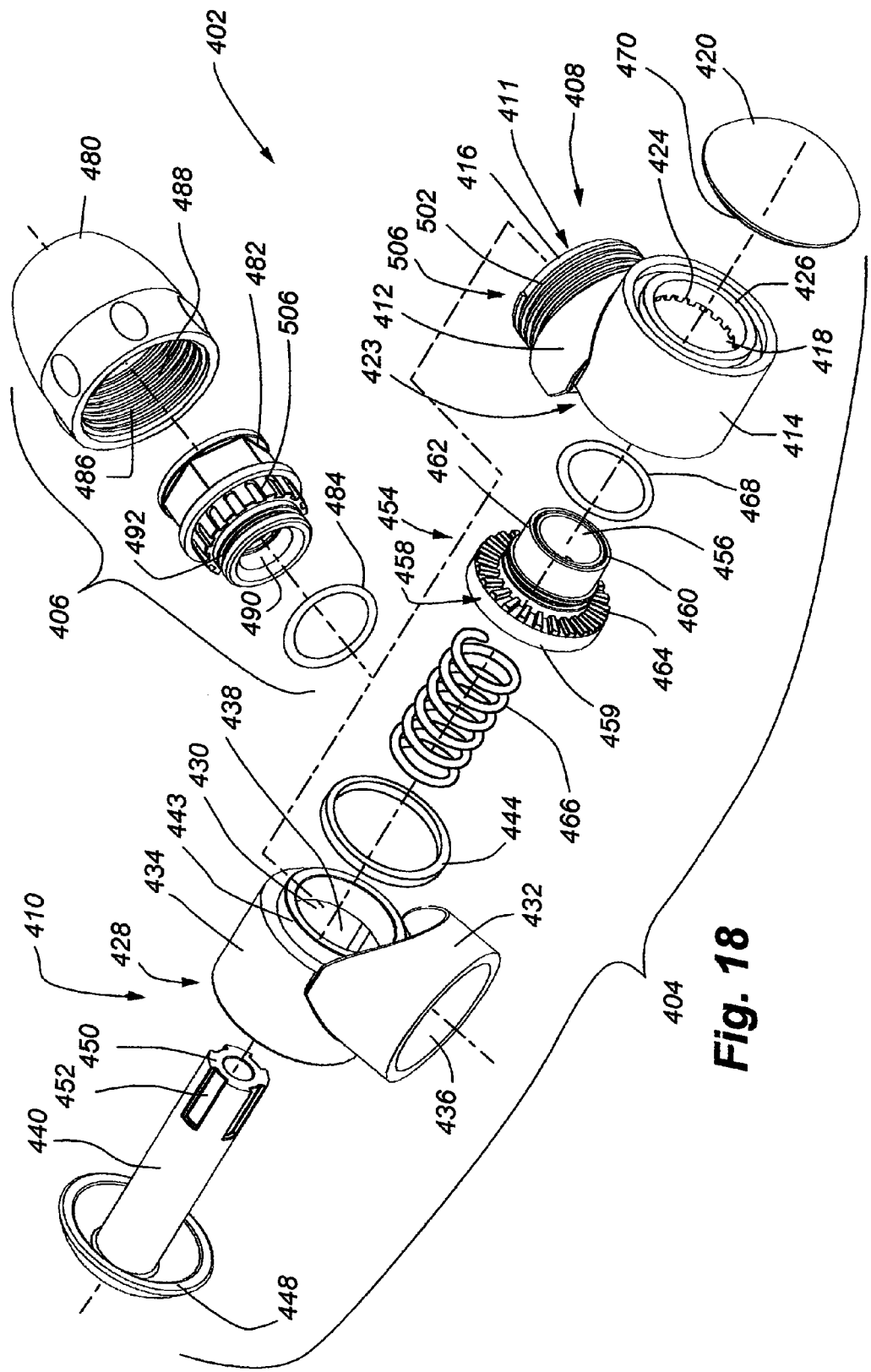
FIG. 18 is an exploded view the adjustment device in FIG. 17.
Figure 21:
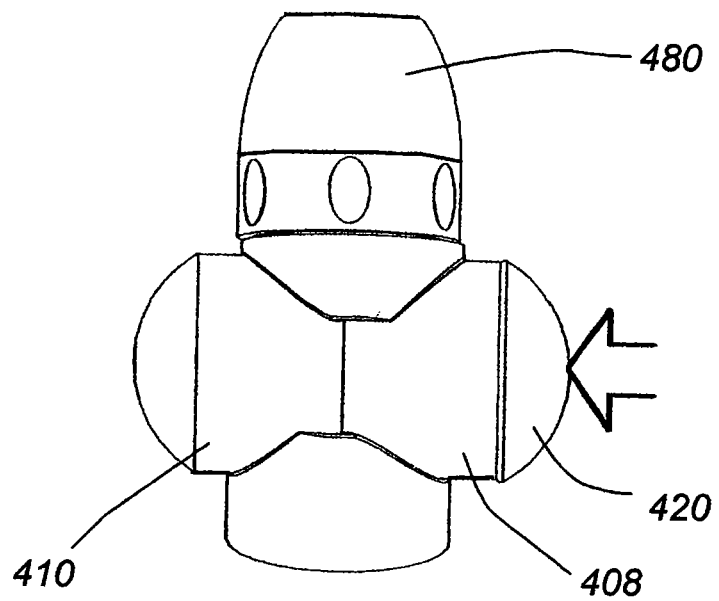
FIG. 21 is a side view of the assembled adjustment device in FIG. 18 showing the button in an actuated position.
Figure 22:
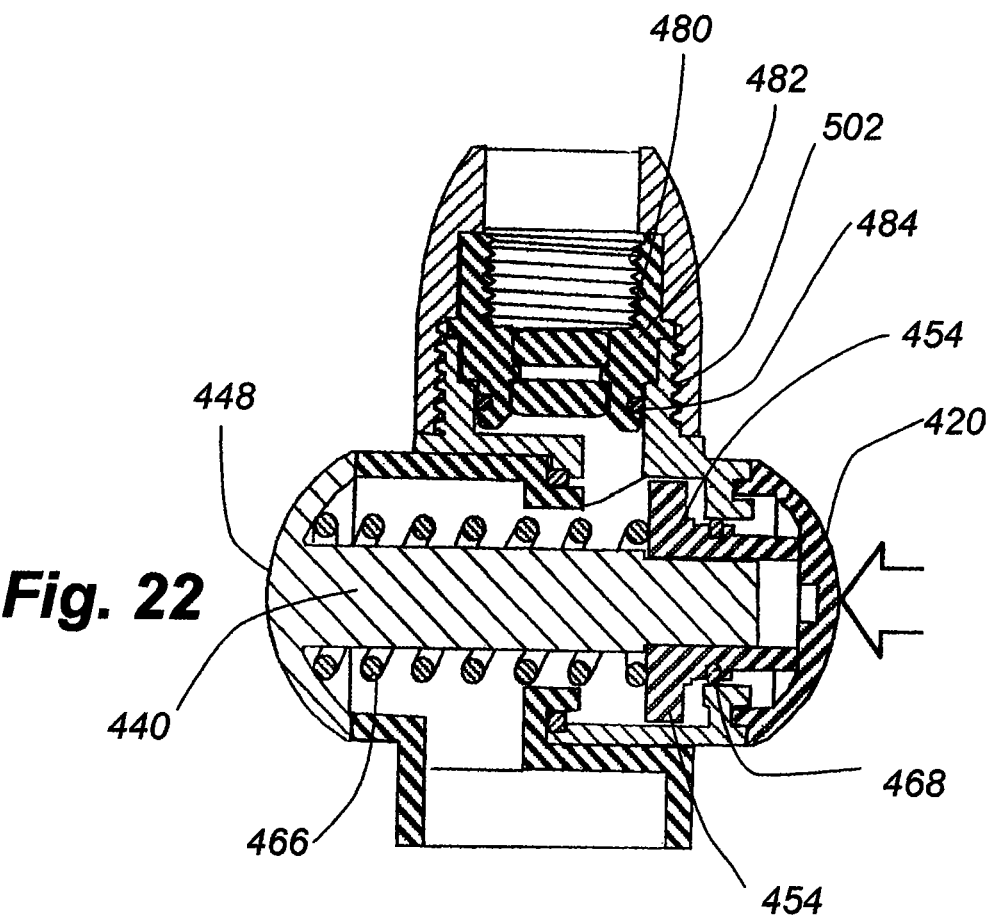
FIG. 22 is a representative-sectional view of the adjustment device in FIG. 21 with the button in the actuated position.

FIGS. 17-22 disclose an alternative attachment mechanism 400 that may be substituted for the pivot ball unit 76 shown in FIG. 1. More specifically, FIG. 17 is a perspective view of the adjustment device 400. FIG. 18 is an exploded view the adjustment device in FIG. 17. FIG. 19 is a side view of the adjustment device in FIG. 17 showing a button biased outwardly in a locked position. FIG. 20 is a side-sectional view of the adjustment device in FIG. 17 along line 20-20 showing the button biased outwardly in the locked position. FIG. 21 is a side view of the assembled adjustment device in FIG. 17 showing the button in an actuated position. FIG. 22 is a representative-sectional view of the adjustment device in FIG. 21. The attachment mechanism 400 of the current embodiment may be included along with similar features and/or functions of previously mentioned embodiments of the showerhead system 10, unless otherwise stated.

Referring to FIGS. 17-18, the adjustment device 400 may include a locking structure 404 and an attaching structure 406 coupled to the locking structure 404. The attaching structure 406 may also be coupled to a shower pipe. The locking structure 404 may also be coupled to the showerhead system 10.

Referring again to FIG. 18, the locking structure 404 may include a locking base 408 and a locking swivel 410. The locking base 408 includes a first leg 412 and a second leg 414. The first leg 412 and the second leg 414 define a generally L-shaped body 411 having a central recess. An end of each leg 412, 414 of the body 411 defines an aperture. A first aperture 416 is an inlet aperture, which is arranged to couple with the attaching structure 406 as is described in more detail below. A second aperture 418 is a button aperture for receiving a button 420 to actuate a locking mechanism 422, also described in more detail below. A third recess 423 may be formed at an intersection of the L-shape for correspondingly mating with the locking swivel 410. A first annular set of gear teeth 424 are formed adjacent the button aperture 418. The gear teeth 424 extend axially away from the button aperture 418. An annular groove 426 may formed around the perimeter of the button aperture 418 for receiving a portion of the button 420, described in more detail below.

Still referring to FIG. 18, the locking swivel 410 also defines a generally L-shaped body 428 having a central chamber 430. The locking swivel may include a first leg 432 and a second leg 434. An end of each leg 432, 434 of the body 428 defines an aperture. A first aperture 436 is the outlet aperture for attaching to a base portion of a showerhead system (not shown). A second aperture 438 may be used to anchor a post 440 that extends through the central bore 430. A third aperture 439 may be formed at the intersection of the L-shape for correspondingly mating with the locking base 408.

As best shown in FIGS. 18 and 20, the locking base 408 and the locking swivel 410 are rotatably engaged with one another about a sealed juncture 442. The sealed juncture may take the form of a rim 443 on the locking swivel 410 along with an annular seal structure 444, such as an o-ring. The rim 443 and the o-ring 444 insert into the third aperture 439 of the locking base 408 to form the rotatable sealed engagement.

Again referring to FIGS. 18 and 20-22, the post 440 extends into the central chamber 430 of the locking swivel 410 and through into the central recess 418 of the locking base 408. The post 440 may be attached to an anchor cap 448 that is anchored to the locking swivel 410 at the anchor aperture 438. The anchor cap 448 encloses the anchor aperture 438. The post 440 may be rotatably stable with respect to the locking swivel 410. As best shown in FIG. 18, a distal end 450 of the post 440, adjacent to and received in the locking base 408, defines at an elongated key slot 452. More specifically, the post 440 may include a plurality of elongated key slots 452.

Still referring to FIGS. 18 and 20-22, a locking ring 454 may be slidingly received on the distal end 450 of the post 440. The locking ring 454 may be generally tubular in shape with a central aperture 456. The locking ring 454 may include at least one key (not shown) extending radially along an inner surface of the locking ring 454 for insertion into the elongated key slot on the post 440. This allows the locking ring 454 to slide along the post 440 for the length of the slots 452 while rotationally fixing the locking ring 454 relative to the post 440. The locking ring 454 has two diameters. A first diameter 458 at a base 459 of the locking ring 454 may be larger than a second diameter 460 of a stem 462 of the locking ring. At the transition wall between the two diameters 460, 462, a second annular set of gear teeth 464 may be formed extending axially toward the stem 462.

Referring to FIGS. 18-20, a spring 466 may be positioned around the post 440. The spring 466 may engage one end the anchor cap 448 and the base 459 of the locking ring 454. The spring 466 may bias the locking ring 454 toward the distal end 450 of the post 440. An annular seal member 468 may be positioned around the stem 462 of the locking ring 454 to create a seal between the stem 462 and an internal wall of the locking base 408 into which the stem is received.

Referring to FIGS. 19-22, the button 420 having an axially extending rim 470 fits into the button aperture 418 on the locking base 408. The rim 470 fits into the annular groove 426 defining the button aperture 418, which allows the button 420 to move axially in the button aperture relative to the locking base. The stem 462 of the locking ring 454 may engage an interior side of the button, so that the button and the locking ring move as one unit.

When the above mentioned units are assembled together, as best shown in FIGS. 20 and 22, the locking ring 454 may be positioned on the post 440 adjacent the button aperture 418 in the locking base 408. The spring 466 biases the second set of gear teeth 464 into engagement with the first set of gear teeth 424 on the locking base 408 to rotationally lock the two halves of the locking structure 404 together and prohibit any rotational movement between the locking swivel and the locking base.

Referring to FIG. 22, in order to disengage the sets of gear teeth 424, 464 and allow movement between the locking swivel 410 and the locking base 408, a user may push the button 420 inwardly into the button aperture 418, against the force of the spring 466. This movement disengages the two sets of gear teeth 424, 464 and allows the locking swivel 410 to rotate relative to the locking base 408. When the desired position is attained, a user disengages the button and the spring biases the locking ring along the length of the post so the second set of gear teeth engage the first set of gear teeth and rotationally fix the locking swivel to the locking base, and thus the orientation of the showerhead system.

Still referring to FIGS. 18 and 20-22, the attachment structure 406 is used to affix the showerhead system to a shower pipe. The attachment structure 406 may include a locking nut 480, a flow adaptor and/or restrictor 482, and a flow restrictor seal 482. The locking nut 480 defines a central cavity 486 with one end treaded for attachment to the locking base 408.

Again referring to FIGS. 20 and 22, the adapter 482 may be received within a central cavity 486 of the locking nut 480 above its thread portion 488 and abut against a floor of the central cavity 486. This abutment prevents the adapter 482 from existing the locking nut 480 once attached to a shower pipe. The adapter 482 also includes an aperture 490 having a thread portion 492, such that the adapter 482 is coupled to a shower pipe via the thread portion 492 of the aperture 490. The aperture 490 may form a water channel that defines part of a water passage for the water flow to travel from the shower pipe to the showerhead system that distributes the water flow for distribution to a user. The adapter may include a restrictor portion 494 to prevent fluids from reentering the shower pipe.

Referring to FIGS. 18 and 20, the locking nut 480 will now be discussed. The threaded recess 488 of the locking nut 480 may be received via a threaded portion 500 of the locking base 408 in order to affix the locking nut 480 to the locking base 408. More specifically, the locking nut 480 may engage the external threads 500 on the inlet end of the locking base to secure the locking base to the locking nut and to trap the flow adapter 482 between the locking nut and the locking base. This structure effectively allows a showerhead system may be easily removed and replaced without removing the flow adapter and/or restrictor 482 from a shower pipe.

As best shown in FIG. 18, the flow adapter 482 may also have external features 506 to mate with corresponding features of the locking base 408 to keep the locking base from rotating relative to the shower pipe. For instance, the outer surface of the inner end of the flow restrictor defines a series of axial grooves formed around the perimeter of the adapter 482. An interior surface of the inlet end 416 of the locking base 408 defines corresponding keys (not shown) to fit in the grooves 506 to keep the locking base from rotating with respect to the flow restrictor. Other structures having the same function are contemplated.

Figure 23:
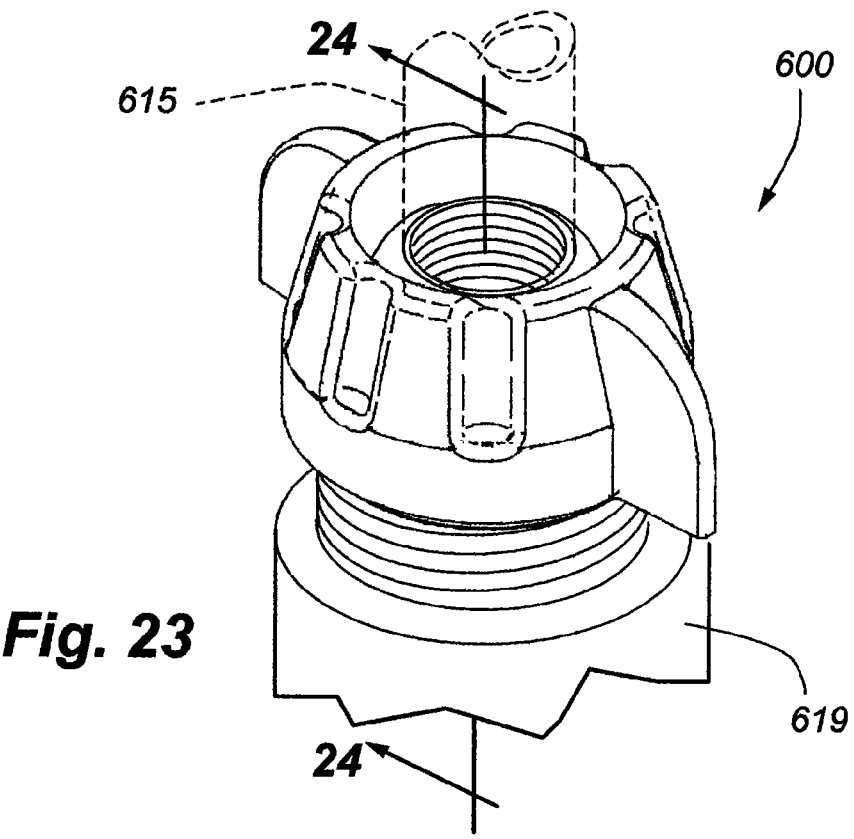
FIG. 23 is a perspective view of an alternative adjustment device.
Figure 24:
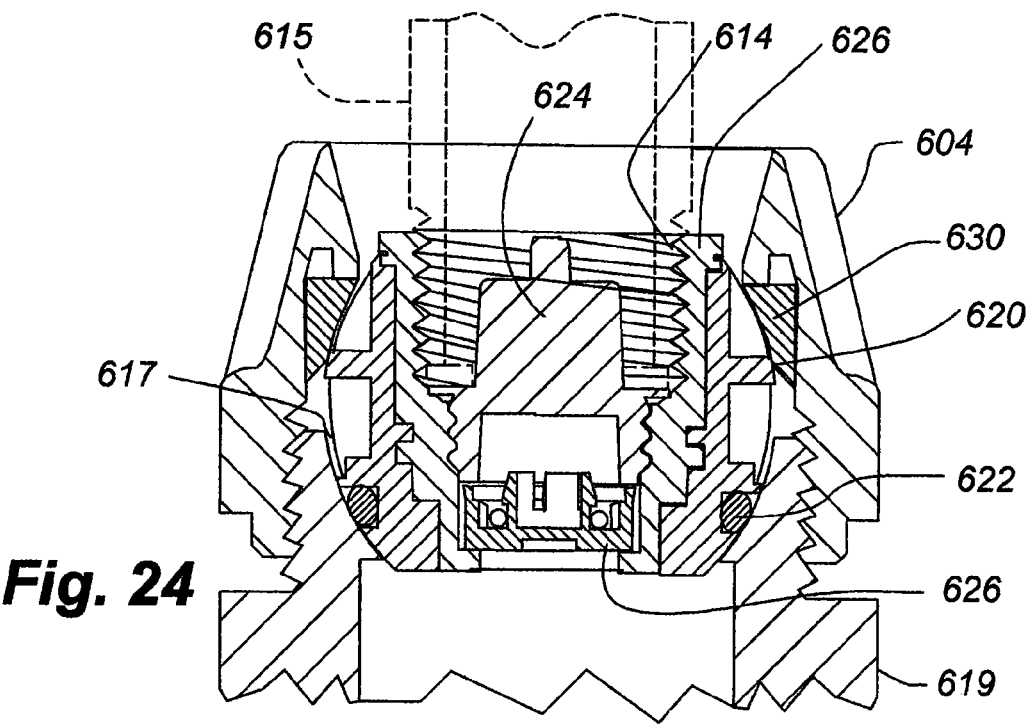
FIG. 24 is a cross-sectional view of the adjustment device in FIG. 23 along line 24-24.
Figure 25:
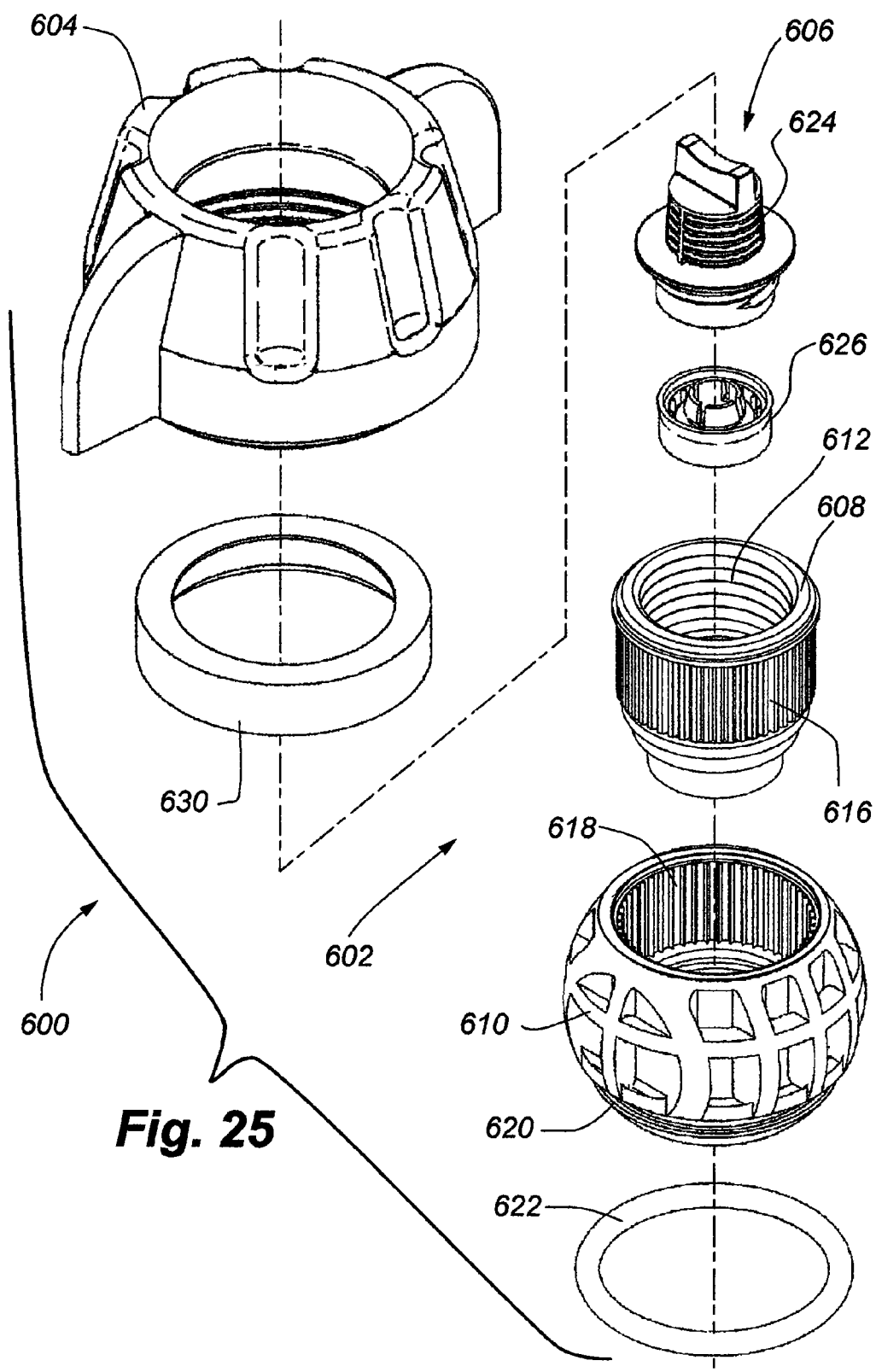
FIG. 25 is an exploded view of the adjustment device in FIG. 23.

FIGS. 23-25 disclose a second alternative attachment mechanism 600 that may be substituted for the attachment mechanism 74. More specifically, FIG. 23 is a perspective view of the adjustment device 600. FIG. 23 is a perspective view of the adjustment device 600. FIG. 24 is a cross-sectional view of the adjustment device in FIG. 23 along line 24-24. FIG. 25 is an exploded view of the adjustment device 600.

Referring to FIGS. 23-25, the attachment mechanism 600 may include a pivot ball assembly 602, a retaining ring or collar 604, and a regulator assembly 606. The pivotal ball assembly 602 and the collar 604 may include similar features and functions of the pivot ball unit 76 and the collar 88, unless otherwise stated.

Referring to FIGS. 24-25, the pivot ball assembly 602 may include a coupling insert 608 and a pivot ball 610 that receives the coupling insert 608. As best shown in FIG. 24, a threaded inner surface 612 of the coupling insert 608 may be couple with a corresponding thread surface 614 of a shower pipe 615. The coupling insert may include a plurality of gear teeth 616 that may engage and correspond with a plurality of gear teeth 618 located on an inner surface of the pivot ball 610.

Again referring to FIGS. 24-25, the pivot ball may include a spherical ball shaped body 620 that corresponds to a receiving aperture 617 of a distributor housing 619. The distributor housing 619 may include the similar features and/or functions as the distributor housing 110 as described above. A seal 622 may be seated between a surface of the pivot ball and a surface of the distributor housing in order to provide a seal to prevent water leakage. This pivot ball assembly 602, when compared to the pivot ball unit 76, uses less material while maintaining all the functional benefits of the pivot ball unit 76.

The regulator assembly 606 may include a filter screen 624 and a regulator portion 626. The regulator assembly 606 may include any conventional regulator assembly that provides the functionality described above. The filter screen 624 may be a rigid or flexible member that separates contaminants and other fine particles out of the water flow. The filter screen may include a threaded portion that screws into a corresponding second inner threaded portion of the coupling insert 608. The regulator 626 may reside within the filter screen and positioned between the filter screen and the coupling insert 608. The regulator control the flow of fluid received a shower pipe.

The collar 604 may include the same and/or similar features as discussed above for the collar 88. The collar 604 may couple the pivot ball assembly 602 to the distributor housing of a control selector mode (not shown). A seal 630 may be positioned between a surface of the collar 604 and the pivot ball assembly 602 in order to provide to prevent water leakage. The collar may include an adjusting guide that extends from an outer surface of the collar to allow a user to easily tighten or loosen the collar from a distributor housing.

While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, the mixing and matching of features, elements and/or functions between various examples is expressly contemplated herein so that one of ordinary skill in the art would appreciate from this disclosure that features, elements and/or functions of one example may be incorporated into another example as appropriate, unless described otherwise, above. Moreover, many modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out this invention, but that the scope of the present disclosure will include any embodiments falling within the foregoing description and the appended claims.

What is claimed is:

1. A showerhead system comprising
a support structure configured to directly couple to a shower pipe to receive water flow therefrom and to be supported on a wall of a shower or bath enclosure thereby, the support structure comprising
a first rigid arm including a first fluid channel;
a second rigid arm spaced apart from the first rigid arm and including a second fluid channel; and
a control mode selector operatively coupled to the first fluid channel and the second fluid channel, the control mode selector configured to transition between a first position to direct water flow to the first fluid channel and a second position to direct water flow to at least the second fluid channel; and
an integral showerhead coupled to the support structure, the showerhead configured to receive and distribute the water flow from at least one of the first and the second fluid channels;
wherein the control mode selector is positioned in a base of the support structure and configured to receive the water flow thereof; and
the first rigid arm extends from the control mode selector to the showerhead and the second rigid arm extends from the control mode selector to the showerhead.

2. The showerhead system of claim 1, wherein the control mode selector is configured to simultaneously distribute the water flow to the first and second fluid channels.

3. The showerhead system of claim 1, wherein the showerhead comprises a plurality of nozzles operatively coupled to the first fluid channel.

4. The showerhead system of claim 1, wherein the showerhead comprises a plurality of nozzles operatively coupled to the second fluid channel.

5. The showerhead system of claim 1, wherein the support structure is configured to be pivotally coupled relative to the shower pipe.

6. The showerhead system of claim 5, wherein the control mode selector is further configured to be pivotally coupled to the shower pipe.

7. The showerhead system of claim 1, wherein the support structure further comprises an adjustment device coupled to the shower pipe and configured to adjust the support structure relative to the shower pipe.

8. The showerhead system of claim 1, wherein at least one of the first rigid arm and the second rigid arm include two or more fluid channels.

9. A showerhead system comprising
a body portion configured to couple to a shower pipe and operative to receive water flow therefrom, the body portion comprising
a base portion with a connector for coupling directly to a shower pipe and thereby supporting the showerhead system on a wall of a shower or bath enclosure;
a first rigid support structure attached to the base portion and having at least one fluid channel configured to receive and transport the water flow from the shower pipe; and
a second rigid support structure attached to the base portion and spaced apart from the first rigid support structure and having at least one fluid channel configured to receive and transport the water flow from the shower pipe; and
an integral head portion coupled to the first and second rigid support structures and operative to receive the water flow from at least one of the first or second rigid support structures to distribute to a user.

10. The showerhead system of claim 9, wherein the at least one fluid channel of the first rigid support structure comprises
a first fluid channel coupled between the base portion and the head portion, the first fluid channel operative to transport the water flow to the head portion; and
a second fluid channel coupled between the base portion and the head portion, the second fluid channel operative to transport the water flow to the head portion.

11. The showerhead system of claim 10, wherein
the base portion further comprises a control mode selector operatively coupled to the shower pipe, the first fluid channel, and the second fluid channel; and
the control mode selector is configured to selectively switch the water flow from the shower pipe between the first fluid channel and the second fluid channel.

12. The showerhead system of claim 10, wherein the at least one fluid channel of the second rigid support structure comprises
a third fluid channel coupled between the base portion and the head portion, the third fluid channel operative to transport the water flow to the head portion; and
a fourth fluid channel coupled between the base portion and the head portion, the fourth fluid channel operative to transport the water flow to the head portion.

13. The showerhead system of claim 12, wherein
the base portion further comprises a control mode selector operatively coupled to the shower pipe, the first fluid channel, the second fluid channel, the third fluid channel, and the fourth fluid channel; and
the control mode selector is configured to selectively direct the water flow to one or more of the first fluid channel, the second fluid channel, third fluid channel, and the fourth fluid channel.

14. The showerhead system of claim 11, wherein the control mode selector is configured to be directly coupled to the shower pipe.

15. The showerhead system of claim 11, wherein the control mode selector is pivotally coupled to the shower pipe in at least one direction.

16. The showerhead system of claim 11, further comprising means for pivotally coupling the control mode selector to the shower pipe.

17. The showerhead system of claim 9, wherein the base portion further comprises a control mode selector operatively coupled to the shower pipe, the at least one fluid channel of the first rigid support structure, and the at least one fluid channel of the second rigid support structure; and
the control mode selector is configured to selectively switch the water flow between the at least one fluid channel of the first rigid support structure and the at least one fluid channel of the second rigid support structure.

18. The showerhead system of claim 1, wherein the control mode selector comprises a distributor spool operative to receive water flow from the shower pipe, and the distributor spool defines a chamber extending along a length thereof and axially aligned with the shower pipe.

19. The showerhead of claim 1, wherein the control mode selector comprises a distributor spool defining a chamber extending along a length thereof, the distributor spool configured to rotate about a longitudinal axis of the chamber as the control mode selector is transitioned between the first and second positions.

20. The showerhead of claim 19, wherein the control mode selector further comprises a distributor housing comprising a first exit port operatively coupled to the first fluid channel and a second exit port operatively coupled to the second fluid channel, and the distributor spool is rotatably coupled within the distributor housing to rotate about a longitudinal axis of the housing for selectively directing the water flow to one of the first and second fluid channels.

21. The showerhead of claim 20, wherein the distributor spool defines an opening within its periphery and a seal positioned within the opening.

22. The showerhead of claim 21, wherein the distributor spool further comprises a pivot ball unit configured to engage an inner surface of the distributor housing.

* * * * *